(12) United States Patent
Diederich et al.

(10) Patent No.: US 7,921,049 B2
(45) Date of Patent: Apr. 5, 2011

(54) COLLATERALIZED EQUITY AND DEBT OBLIGATION FINANCIAL PRODUCT

(75) Inventors: Stephane Diederich, Luxembourg (LU); Lionel Fournier, London (GB)

(73) Assignee: Credit Suisse Securities (USA) LLC, New York, NY (US)

(*) Notice: Subject to any disclaimer, the term of this patent is extended or adjusted under 35 U.S.C. 154(b) by 603 days.

(21) Appl. No.: 11/704,690

(22) Filed: Feb. 9, 2007

(65) Prior Publication Data

US 2007/0282727 A1 Dec. 6, 2007

Related U.S. Application Data

(60) Provisional application No. 60/771,978, filed on Feb. 9, 2006.

(51) Int. Cl.
*G06Q 40/00* (2006.01)

(52) U.S. Cl. .......................... 705/36 R; 705/35; 705/37

(58) Field of Classification Search .................... 705/36, 705/36 R
See application file for complete search history.

(56) References Cited

U.S. PATENT DOCUMENTS

| | | | | |
|---|---|---|---|---|
| 6,839,686 B1* | 1/2005 | Galant | ........................ | 705/36 R |
| 7,089,207 B1* | 8/2006 | Lardy et al. | ...................... | 705/38 |
| 2004/0181479 A1* | 9/2004 | Zosin et al. | ...................... | 705/36 |
| 2004/0183800 A1* | 9/2004 | Peterson | ........................ | 345/440 |
| 2005/0044029 A1* | 2/2005 | Griffin et al. | ................... | 705/36 |
| 2006/0259378 A1* | 11/2006 | Fornasari | ........................ | 705/35 |
| 2007/0078739 A1* | 4/2007 | Levin et al. | ................. | 705/36 R |
| 2007/0106591 A1* | 5/2007 | Waisbren | ..................... | 705/36 R |
| 2007/0192228 A1* | 8/2007 | Phelps et al. | ................. | 705/36 R |
| 2007/0208644 A1* | 9/2007 | Deckoff | ...................... | 705/36 R |
| 2008/0222050 A1* | 9/2008 | Grossman | ................... | 705/36 R |

* cited by examiner

*Primary Examiner* — Jagdish N Patel
*Assistant Examiner* — Kevin Poe
(74) *Attorney, Agent, or Firm* — King & Spalding LLP

(57) ABSTRACT

A financial product is created by receiving funds from investors to purchase collateral, such as stock or bonds, in companies to populate an insurance portfolio and a risk portfolio. Notes backed by the collateral are issued to the investors and pay a coupon amount based on the performance of the collateral. The collateral is monitored over time to determine whether distressed equity events occur which coincide with the collateral value falling below a predetermined amount of its original share price. The number of distressed equity events between companies in the insurance portfolio and risk portfolio offset each other to give a total number of net hits. Subsequently, the total number of net hits is used to calculate an impact on the amount of the coupon pay-out to the investors.

54 Claims, 15 Drawing Sheets

1500

| | Bond Market Implied Equity Volatility | Equity Market Implied Equity Volatility | Industry | Geography |
|---|---|---|---|---|
| Risk Portfolio | Lower | Higher | Diversified | Diversified |
| Insurance Portfolio | Higher | Lower | Diversified | Diversified |
| Correlation | Similar Credit Quality | Optimized Volatility Spread | Similar Industry Diversification | Similar Geographical Diversification |

Figure 15

COLLATERALIZED EQUITY AND DEBT OBLIGATION FINANCIAL PRODUCT

RELATED APPLICATIONS

This patent application claims priority under 35 U.S.C. §119 to U.S. Provisional Patent Application No. 60/771,978, entitled "CEDO: Collateralized Equity and Debt Obligations," filed Feb. 9, 2006. The complete disclosure of the above-identified priority application is hereby fully incorporated herein by reference.

FIELD OF THE INVENTION

The invention relates generally to an investment-grade security product backed by a pool of bonds, loans and other assets. More particularly, the invention relates to an investment-grade security product that consists of notes that are rated asset-backed securities consisting of high-grade bonds and a diversified overlay of equity default swaps which seeks to exploit the relative value offered by equity versus debt at or close to credit default situations.

BACKGROUND OF THE INVENTION

A collateralized debt obligation ("CDO") is an investment-grade security backed by a pool of bonds, loans, and other assets. CDOs do not specialize in one type of debt but typically include bonds or non-mortgage loans. CDOs are unique in that they represent different types of debt and credit risk. The different types of debt are often referred to as "tranches" or "slices." Each tranche has a different risk associated with it, and the higher the risk associated with the tranches, the more the CDO typically pays.

Conventional CDO transactions have utilized credit default swaps ("CDSs") in their portfolios. A CDS is designed to transfer the credit exposure of fixed income products between parties. CDSs allow the buyer of a credit swap to receive credit protection, whereas the seller of the swap guarantees the credit worthiness of the product. Therefore, the risk of default is transferred from the holder of the fixed income security to the seller of the swap. For example, the buyer of a credit swap will be entitled to the par value of a bond by the seller of the swap, should the bond default in its coupon payments. CDSs are triggered when the company is subject to bankruptcy, failure to pay, and restructuring. However, in CDO transactions consisting entirely of CDSs, it has been difficult to achieve higher than an A3 rating because of the uncertainty of risks related to the likelihood of a company actually defaulting in order to trigger a CDS.

Therefore, conventional CDO transactions have recently utilized small portions of barrier options, such as equity default swaps ("EDS"), within their portfolios in conjunction with the CDS. For example, some conventional CDO transactions have been composed of ten to fifteen percent of EDSs. The use of EDSs helps exploit the relative value opportunities between equity and debt. EDSs are utilized because there is a strong correlation between a company defaulting and a substantial drop in its share price. Therefore, EDSs are triggered when a company's share price falls below a predetermined barrier price, which is typically at 30-35% of its initial value. For EDSs, there's a greater likelihood that a stock will fall to 35% of its initial value than of the company actually defaulting. However, because of the possibility of a crash scenario where an entire stock market could fall due to some external factor affecting market sentiment, without actually triggering an EDS for any one company, means that it has been virtually impossible to achieve a high financial rating on conventional EDS transactions.

The virtual impossibility of being able to achieve a high financial rating on conventional CDO transactions involving EDSs within their portfolios prevents some investors from participating because of the increased risk of those transactions.

Accordingly, a need exists in the art for creating a CDO transaction that utilizes EDSs within their portfolios to exploit the relative value opportunities between equity and debt and has the ability to achieve a high rating.

SUMMARY OF THE INVENTION

The invention relates to an investment-grade security product. More specifically, the invention relates to creating a collateralized debt obligation ("CDO") transaction that utilizes equity default swaps ("EDS") within its portfolios to exploit the relative value opportunities between equity and debt.

According to one aspect of the invention, investors can provide funds to a sponsor of a special purpose vehicle entity ("SPV"). The SPV can use the funds to purchase collateral, such as stocks and bonds, in certain companies ("names"). The names in which to invest can be chosen by a model to fill a long risk ("risk") portfolio and short risk ("insurance") portfolio. This model can allow the identification of relative value opportunities by locating price differences between the debt and equity markets, and names with such value opportunities are selected for the risk and insurance portfolios. One example of this model can be the Credit Underlying Securities Pricing ("CUSP®") model.

In return for the purchased collateral, the SPV can then issue notes and swap the notes with the sponsor for the purchased collateral. The sponsor can then transfer the notes to the investors. Thereafter, the names can be monitored to determine whether a distressed equity event occurs. A distressed equity event can occur when the price of a share drops below a certain threshold, or barrier, of its original share price. Depending on which portfolio, risk or insurance, the name is located in, a hit count associated with that portfolio is increased when the distressed equity event occurs.

Based on the number of distressed equity events, a total number of net hits can be calculated, which can be used to calculate an impact on a number of tranches of the collateral. Having an insurance portfolio can be beneficial because it can allow losses in the risk portfolio to be offset by gains in the insurance portfolio. Therefore, the total number of net hits is determined by subtracting the number of hits in the insurance portfolio from the number of hits in the risk portfolio. Thus, when the total number of net hits is greater than zero, this result can represent that there could be an impact on at least one of the tranches in the investment product.

To determine a potential impact on the tranches, the SPV can first determine which of the tranches is impacted by utilizing the total net hits value. When it is determined which tranches are impacted, the SPV can then calculate the actual loss on the value of the notional of the impacted tranche. Furthermore, to maintain the notional value as close to 100% as possible, the SPV can utilize an interest reserve system whereby losses can be allocated to coupon payments to compensate for the loss of notional value.

Finally, after determining which tranches are impacted, a coupon can be paid out to investors on the notes that they hold at the end of the return period. If the total net hits is a high number, it can be possible that some or all of the tranches will not pay a coupon. In the alternative, if the total net hits is a lower number, it may be possible that a full coupon could be paid for each of the tranches. Thus, depending on the number of net hits, a tranche may not pay any coupon, may pay a reduced coupon when part of the coupon is allocated to compensate for loss of notional value of the tranche, or may pay a full coupon.

These and other aspects, objects, and features of the invention will become apparent from the following detailed description of the exemplary embodiments, read in conjunction with, and reference to, the accompanying drawings.

BRIEF DESCRIPTION OF THE DRAWINGS

FIG. 15 is a table illustrating the correlation of features of selecting names for the risk and insurance portfolios based on similar characteristics according to an exemplary embodiment of the invention.

DETAILED DESCRIPTION OF EXEMPLARY EMBODIMENTS

Figure 1:
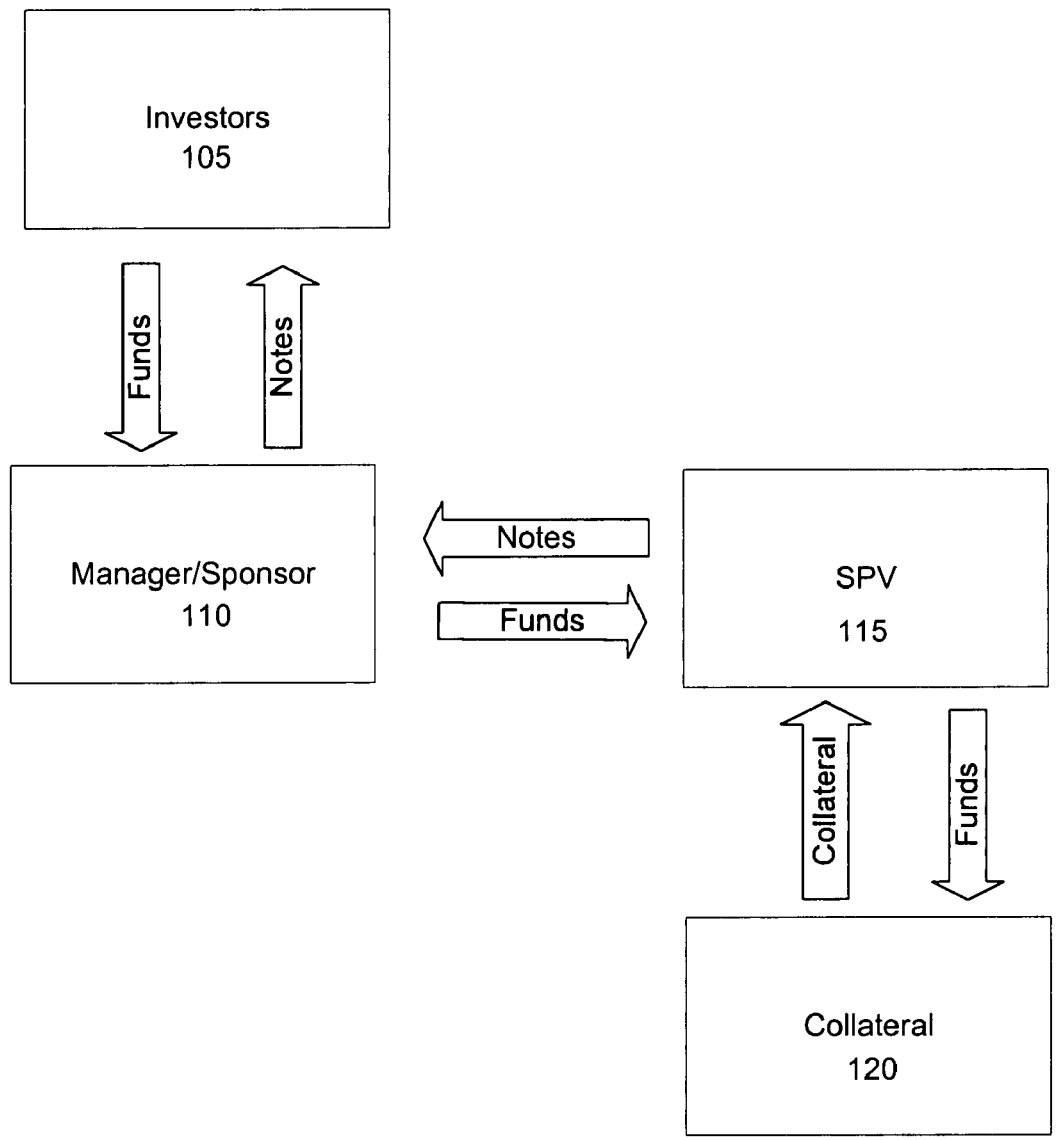
FIG. 1 is a block diagram depicting the representative structure of a collateralized equity and debt obligation financial product according to an exemplary embodiment of the invention.

Referring to the drawings, in which like numerals represent like elements, aspects of the exemplary embodiments will be described.

FIG. 1 is a block diagram depicting the representative structure 100 of a collateralized equity and debt obligation financial product according to an exemplary embodiment of the invention. The parties and structure depicted in FIG. 1 will be discussed in more detail with reference to the methods illustrated in FIG. 2-15.

Figure 2:
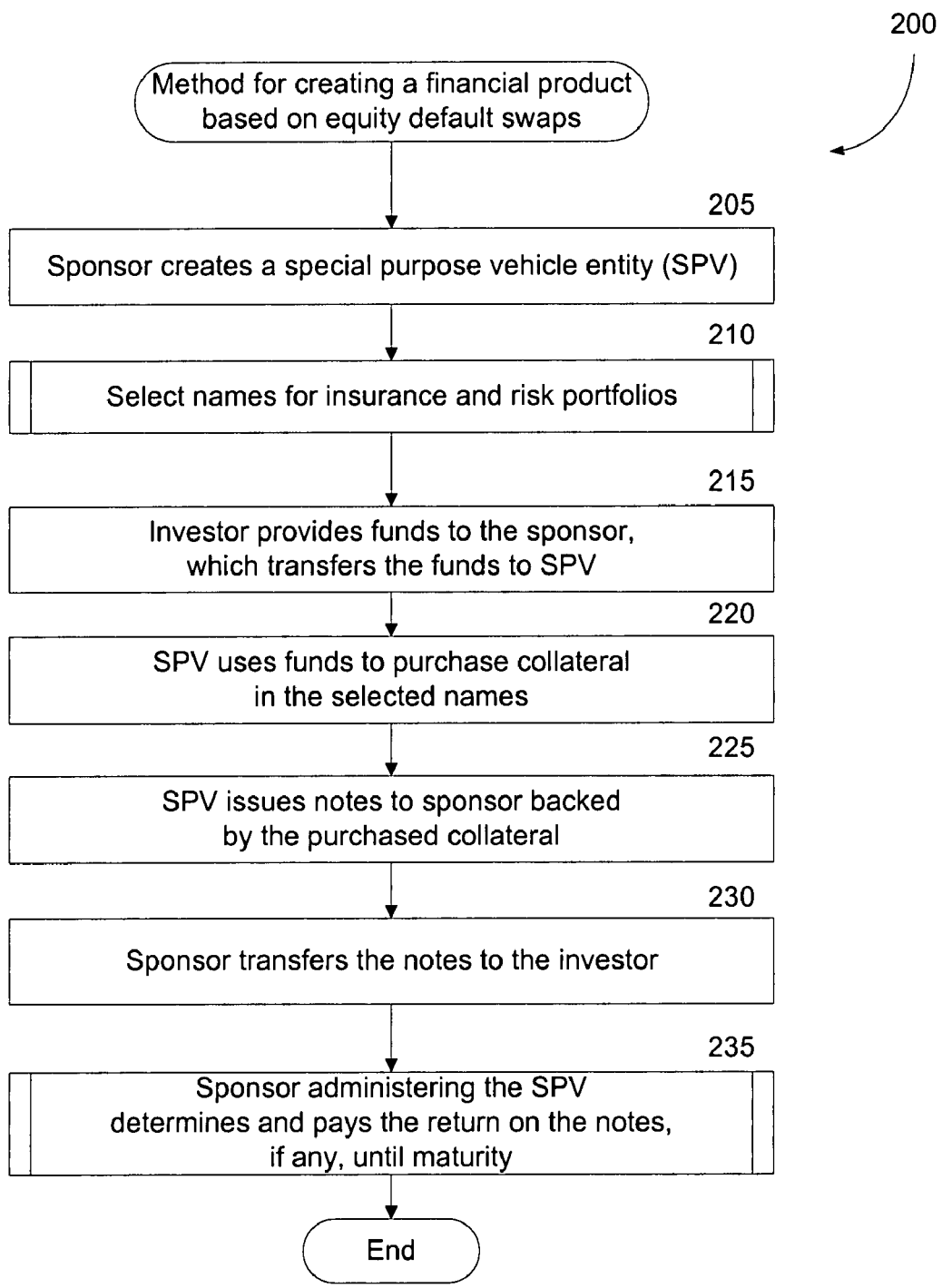
FIG. 2 is a flow chart depicting a method for creating a collateralized equity and debt obligation ("CEDO") financial product based on equity default swaps according to an exemplary embodiment of the invention.

FIG. 2 is a flow chart depicting a method 200 for creating a collateralized equity and debt obligation ("CEDO") financial product based on equity default swaps according to an exemplary embodiment of the invention. The method 200 will be discussed in detail with reference to FIGS. 1 and 2.

In step 205, a sponsor 110 creates a special purpose vehicle entity ("SPV") 115 to conduct transactions with investors 105. In an exemplary embodiment, the SPV 115 can be an exempt company with limited liability, typically organized in a country having favorable laws. The SPV 115 can be formed for the purpose of issuing notes and purchasing and financing financial assets. The SPV 115 can contractually limit its business activities and its ability to commence insolvency proceedings voluntarily. Additionally, each party that enters into a material agreement with the SPV 115 can agree that it will not commence, or join any person in commencing, against the SPV 115 any bankruptcy, examination, reorganization, arrangement, insolvency, or liquidation proceeding for a specified term, such as one year, after the latest maturing note is paid in full. The SPV 115 operates a financial product administered by the sponsor 110. Additionally, the SPV 115 operates as a limited purpose investment company under guidelines set forth by the sponsor 110. Investors 105 can be one or more investors in the CEDO financial product.

The SPV 115 may be structured as a special purpose company which (a) purchases, makes loans secured by, and otherwise acquires interests (including both ownership and security interests) in, or undivided interests in, portfolios of accounts, general intangibles, chattel paper, instruments, certificated and uncertificated securities, investment property, or other financial assets, including, without limitation, publicly or privately issued securities, which may be secured by or represent interests in any of the foregoing or be unsecured debt, equity securities, commercial paper, and credit-linked notes ("financial assets"), (b) sells or otherwise disposes of interests in financial assets and (c) engages in other activities incidental to the foregoing.

In step 210, the sponsor 110 selects names (in other words, companies) for the long risk and short risk portfolios of the CEDO financial product. Step 210 will be discussed in more detail hereinafter with reference to FIG. 4. Furthermore, the long risk and short risk portfolios will hereinafter be referred to as the risk and insurance portfolios, respectively. In general, according to an exemplary embodiment, the selection of names in step 210 can be performed by utilizing a model that identifies names with relative value opportunities by locating price differences between the debt and equity markets. One example of this model is the Credit Underlying Securities Pricing ("CUSP®") model that is based on Robert Merton's contingent claim model.

The idea behind the CUSP® model is that debt and equity are linked through the balance sheet of a firm. Therefore, by applying a "put-call parity" to the balance sheet of a firm, the market credit spread and the expected equity volatility can be linked. This link allows the identification of relative value opportunities, for example, between an expensive credit spread and a cheap equity option volatility. The relative value opportunities are identified by locating price differences between the debt and equity markets. Names with such value opportunities are selected for the risk and insurance portfolios.

In step 215, the investors 105 provide funds to the sponsor 110, which transfers the funds to the SPV 115. In step 220, the SPV 115 uses the funds to purchase collateral 120 in the selected names from step 210. Typically, the collateral 120 is a cash deposit or security that carries the highest rating from a reputable rating agency. For example, the collateral could be a AAA rated bond as rated by Moody's. More specifically, the collateral 120 can be in the form of AAA U.S. Agencies in U.S. dollars (USD). Furthermore, the collateral 120 can be in the form of AAA EU government bonds, AAA German Pfandbriefe, AAA German Landesbanks, and AAA non-German covered bonds like Cedulas or Obligations Foncières all in the form of Euros (EUR).

After purchasing the collateral, the SPV 115 issues notes backed by the purchased collateral in step 225 and enters into a swap with the sponsor 110. Therefore, the sponsor 110 and the SPV 115 are essentially swapping the collateral for the notes. Then, in step 230, the sponsor 110 transfers the notes to the investors 105.

The notes returned to all of the investors 105 are divided into tranches based on the credit rating associated with the collateral on which the specific notes are based. The tranches make up what is typically referred to a the deal's "capital structure," and the notes are typically paid sequentially beginning with the most senior tranches down the line to the most subordinate tranches. By way of example only, the capital structure of the product could comprise, beginning with the most senior, super senior tranches, senior tranches, mezzanine tranches, and equity tranches. The tranches may include notes with a variety of credit ratings. For example, the ratings can comprise AAA, Aa2, A2, Baa2, or other suitable rating.

When investing in the CEDO product, the investors 105 are allowed to determine the type of risk desired. For example, an investor who prefers to have little risk involved in the investment is most likely to pay for and receive AAA notes that are included in the super senior tranche, because payments on these notes are typically made before lower rated notes. These AAA notes would be much more likely to be paid in their entirety; however, the return paid on these notes will be less than the return paid on a lower rated, more risky note. In contrast, another investor may be more likely to pay for and accept Baa2 rated notes because they are willing to undertake the possible risk of losing value on their investment in return for possibly reaping the rewards of a higher return. Furthermore, an investor can purchase notes at different tranche levels in order to diversify their portfolios.

In step 235, the sponsor 110 administering the SPV 115 determines and pays the return on the notes, if any, until maturity of the notes. The return on the notes is typically paid quarterly, semi-annually, or annually, but the return can be paid in any suitable period. Step 235 will be discussed in more detail hereinafter with reference to FIG. 3.

After step 235, the method 200 ends.

Figure 3:
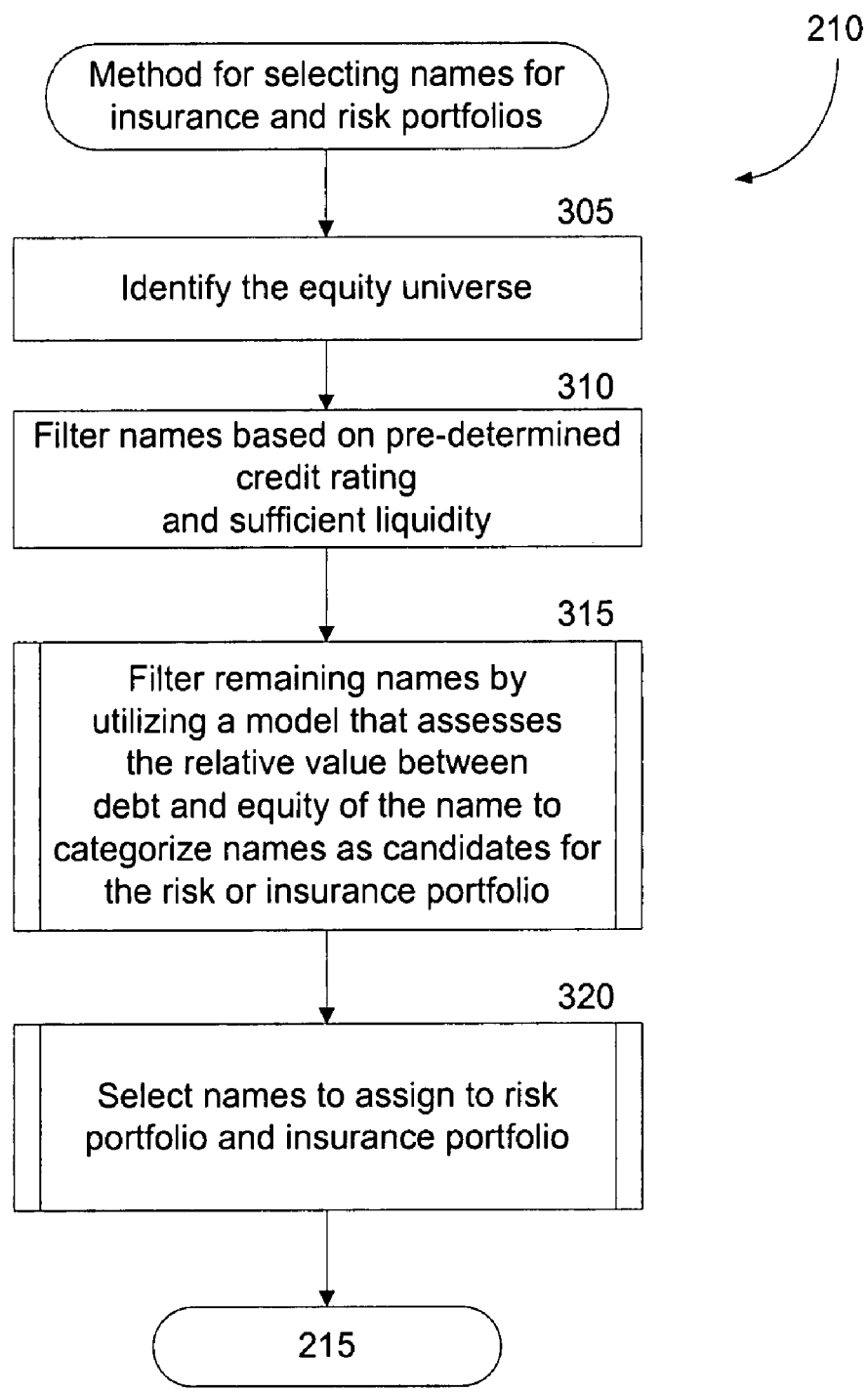
FIG. 3 is a flow chart illustrating a method for selecting names for the risk and insurance portfolios of the CEDO financial product according to an exemplary embodiment of the invention.

FIG. 3 is a flow chart illustrating a method 210 for selecting names for the risk and insurance portfolios of the CEDO financial product according to an exemplary embodiment of the invention, as referred to in step 210 of FIG. 2. The method 210 will be described with reference to FIGS. 1 and 3.

Initially, in step 305, the sponsor 110 begins by identifying the equity universe from which to choose the names for the insurance and risk portfolios. In exemplary embodiments, the equity universe can comprise the entire equity universe or a defined subset thereof. The equity universe comprises all names in which the SPV 115 can invest.

In step 310, the sponsor 110 narrows the list of names from the equity universe by filtering out equities with a credit rating below a predetermined threshold or equities that do not have a sufficient predetermined liquidity level. In exemplary embodiments, the resulting "restricted" equity universe can comprise equities from major indices, such as the S&P 500, DJ STOXX® indices, and/or Nikkei 225.

Next, in step 315, the list of names is further narrowed by filtering the names based on a model that assesses the relative value between debt and equity of each name. The model can utilize the equity price, option implied volatility, credit spread, and leverage information regarding each name and can link these values to the credit risk of the name. Step 315 will be discussed in more detail hereinafter with reference to FIG. 4.

After the list of names is further narrowed in step 315, names are selected and assigned to the risk and insurance portfolios in step 320. Step 320 will be discussed in more detail hereinafter with reference to FIG. 5. After step 320, method 210 ends and returns to step 215 of FIG. 2.

Figure 4:
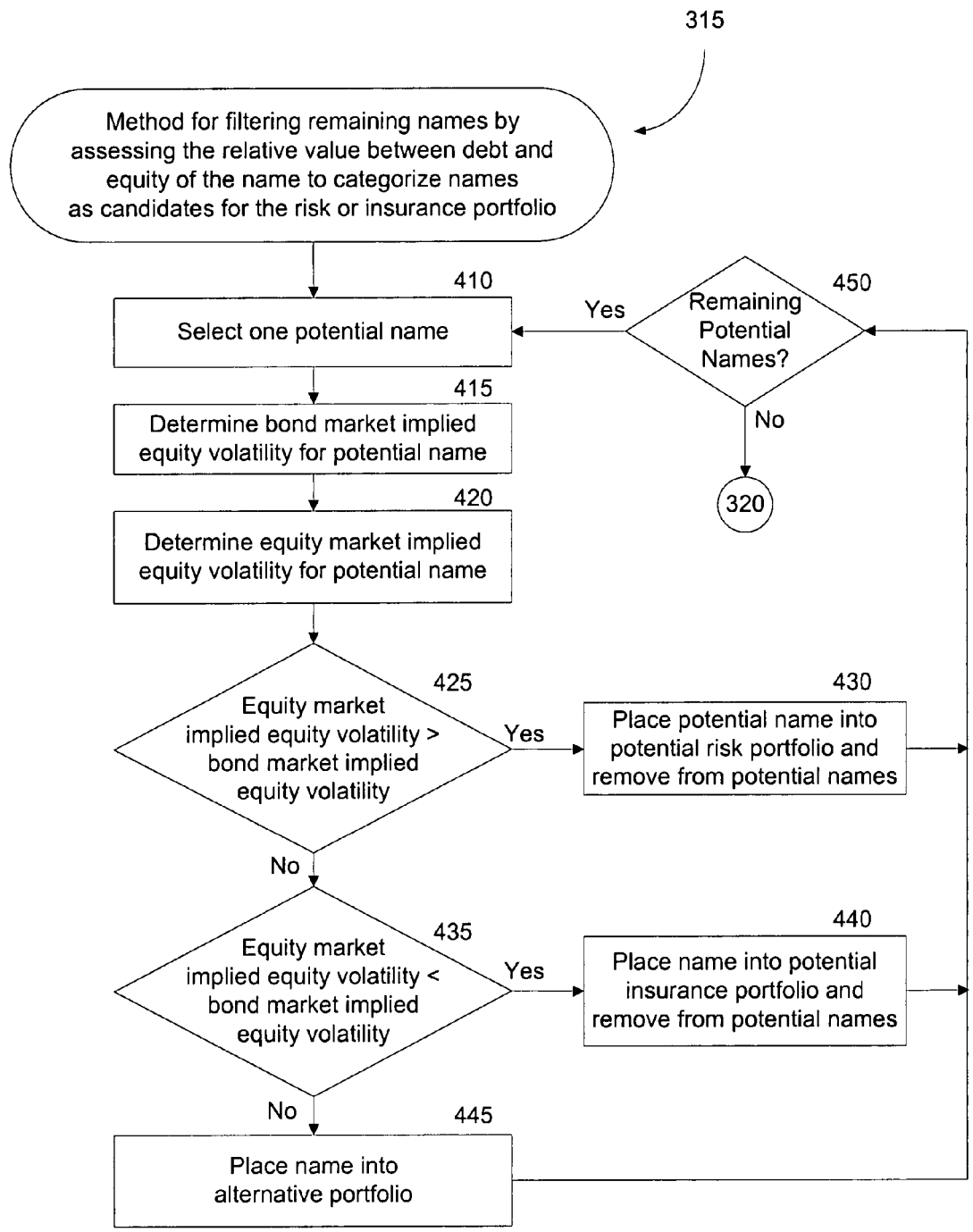
FIG. 4 is a flow chart illustrating a method for filtering names for the risk and insurance portfolios by assessing a relative value between the debt and equity of each name to categorize the names as potential candidates for the risk or insurance portfolio according to an exemplary embodiment of the invention.

FIG. 4 is a flow chart illustrating a method 315 for filtering names for the risk and insurance portfolios by assessing a relative value between the debt and equity of each name to categorize the names as potential candidates for the risk or insurance portfolio according to an exemplary embodiment of the invention, as referred to in step 315 of FIG. 3. The method 315 will be described with reference to FIGS. 1 and 4.

Initially, the sponsor 110 has a list of potential names that were created as a result of the filtering in step 310 of FIG. 3. One of ordinary skill in the art would understand that this list of potential names can comprise a list of potentially hundreds or thousands of equities.

In step 410, the sponsor 110 selects a potential name from the list of filtered names. In step 415, a bond market implied equity volatility is determined for the potential name selected in step 410 by utilizing a model with features discussed previously with reference to step 210 of FIG. 2. Next, in step 420, the equity market implied equity volatility is determined for the potential name selected in step 410 also by utilizing a model with features discussed previously with reference to step 210 of FIG. 2.

In decision step 425, the method 315 determines whether the equity market implied equity volatility is greater than the bond market implied equity volatility for the selected name. If yes, the method 315 branches to step 430 in which the potential name selected in step 510 is placed into the potential risk portfolio and removed from the potential names list.

After the potential name is moved to the potential risk portfolio, the method 315 proceeds to decision step 450 to determine whether there are additional potential names to evaluate. If yes, then the method 315 branches back to step 410 to select another name from the list of potential names. If all names from the list of potential names have been evaluated, then the method 315 branches to step 320 (FIG. 3).

Referring back to step 425, if the equity market implied equity volatility is not greater than the bond market implied equity volatility, the method 315 branches to decision step 435. In decision step 435, the method 315 determines whether the equity market implied equity volatility is less than the bond market implied equity volatility. If yes, the method 315 branches to step 440 in which the potential name selected in step 510 is placed into the potential insurance portfolio and removed from the potential names list.

After the potential name is moved to the potential insurance portfolio, the method 315 proceeds to decision step 450 to determine whether there are additional potential names to evaluate. If yes, then the method 315 branches back to step 410 to select another name from the list of potential names. If all names from the list of potential names have been evaluated, then the method 315 branches to step 320 (FIG. 3).

Referring back to step 435, if the equity market implied equity volatility is not less than the bond market implied equity volatility, the method 315 branches to step 445. In step 445, the method 315 places the potential name selected in step 510 into an alternative portfolio and removes the name from the potential names list.

After the potential name is moved to the alternative portfolio, the method 315 proceeds to decision step 450 to determine whether there are additional potential names to evaluate. If yes, then the method 315 branches back to step 410 to select another name from the list of potential names. If all names from the list of potential names have been evaluated, then the method 315 branches to step 320 (FIG. 3).

As previously stated, one example of a model that can be utilized to perform the filtering of step 415 is CUSP® which was developed by Credit Suisse. CUSP® is an analytical model that relates an issuer's capital structure, stock price, and the option implied volatility of its shares to credit risk and is used to identify the relative value opportunities in particular names by locating price differences between the debt and equity markets. The CUSP® model is well known to one of ordinary skill in the art and additional information regarding CUSP® can be found at http://www.cusp.com.

Figure 5:
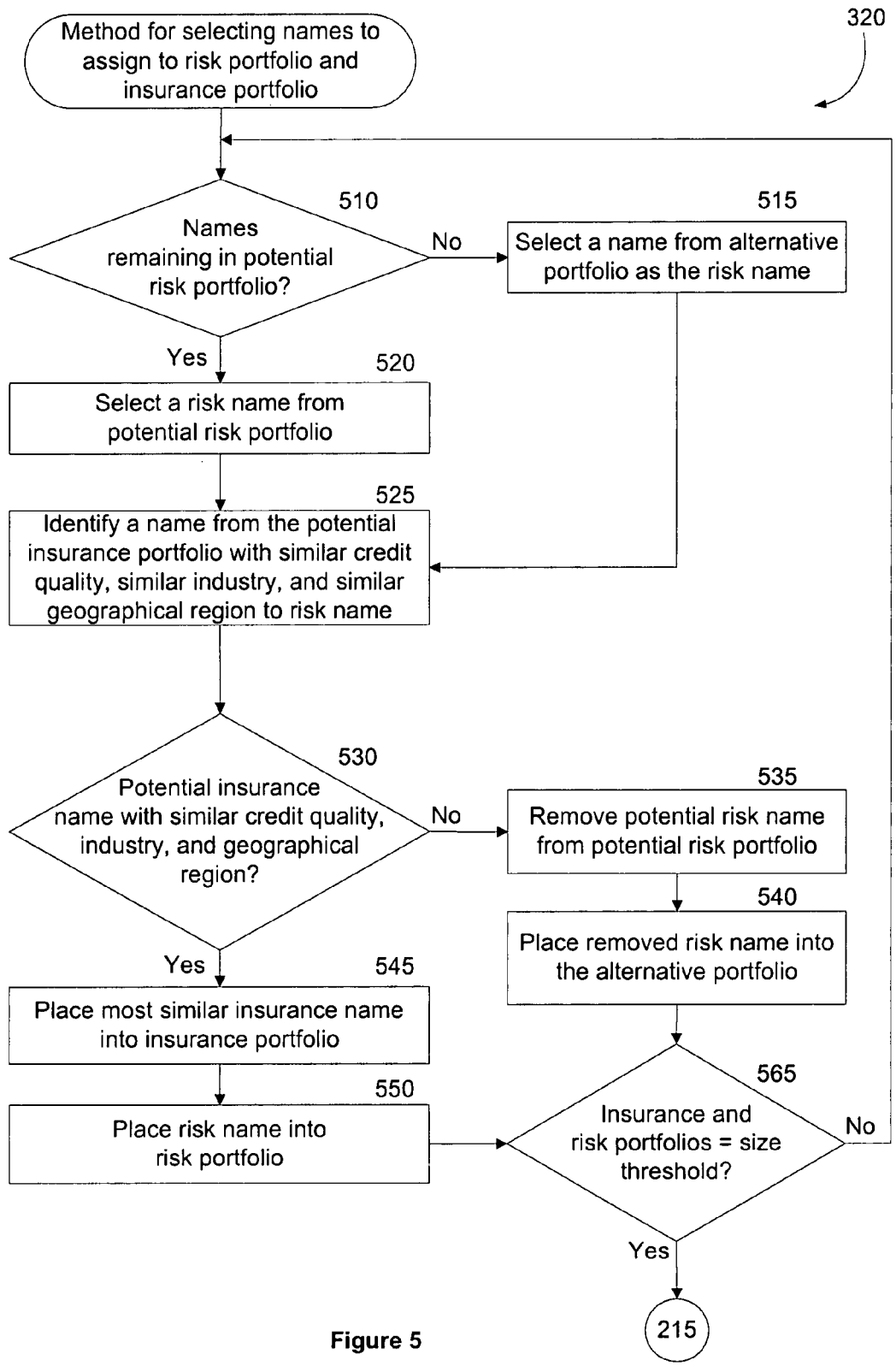
FIG. 5 is a flow chart illustrating a method for assigning names to the risk and insurance portfolios according to an exemplary embodiment of the invention.

FIG. 5 is a flow chart illustrating a method 320 for assigning names to the risk and insurance portfolios according to an exemplary embodiment of the invention, as referred to in step 320 of FIG. 3. The method 320 will be described with reference to FIGS. 1 and 5.

In step 510, the method 320 determines whether any names remain in the potential risk portfolio. If yes, then the method 320 branches to step 520 in which one name from the potential risk portfolio is selected. The method 320 then proceeds to step 525.

Referring back to step 510, if the method 320 determines that the potential risk portfolio does not include any additional names, the method 320 branches to step 515. In step 515, one name from the alternative portfolio is selected as a potential risk name. The method 320 then proceeds to step 525.

In step 525, the sponsor 110 identifies a potential insurance name from the potential insurance portfolio with a similar credit quality, similar industry, and similar geographical region to the potential risk name selected in step 520 or step 515. In decision step 530, the method 320 determines whether a potential insurance name from the potential insurance portfolio meets those characteristics. The comparison of names from the potential risk and insurance portfolios and the determination of whether they are similar is discussed in further detail hereinafter with reference to FIG. 15.

If the method 320 determines in step 530 that a potential insurance name with similar characteristics exists in the potential insurance portfolio, the method 320 branches to step 545. In step 545, the potential insurance name that is most similar to the potential risk name is placed into the insurance portfolio. Then, in step 550, the potential risk name selected in step 520 of 515 is placed into the risk portfolio. The method 320 then proceeds to step 555.

Referring back to step 530, if similar potential insurance names do not exist in the potential insurance pool, then the method 320 branches to step 535. In step 535, the potential risk name is removed from the potential risk portfolio and, in step 540, is placed into the alternative portfolio. The method 320 then proceeds to step 555.

In step 555, the method 320 determines whether the risk and insurance portfolios each include a desired number of names. In an exemplary embodiment, the sponsor 110 can determine a threshold for how many names to include in both the risk and insurance portfolios. For example, the risk and insurance portfolio's can each comprise sixty names. If the method 320 determines in step 555 that that risk and insurance portfolios do not include the desired number of names, then the method 320 branches back to step 510 to select additional names for the risk and insurance portfolios. If the risk and insurance portfolios include the desired number of names, then the method 320 branches to step 215 (FIG. 2).

FIG. 15 is a table illustrating the correlation of features of selecting names for the risk and insurance portfolios based on similar characteristics according to an exemplary embodiment of the invention. As previously discussed with reference to step 530 of FIG. 5, the sponsor 110 selects potential names from the potential risk and insurance portfolios to include in the actual risk and insurance portfolios based on certain features, such as similar credit rating, industry, and geography. The purpose of optimizing the correlation between the insurance and risk portfolios is to offset possible losses in the risk portfolio by EDSs in the insurance portfolio.

First, for the purposes of selecting names, names with higher equity market implied equity volatilities than bond market implied equity volatilities are chosen for the risk portfolio (see step 425 of FIG. 4), and companies with equity market implied equity volatilities lower than bond market implied equity volatilities are chosen for the insurance portfolio (see step 435 of FIG. 4). Furthermore, names in the risk and insurance portfolios can be chosen based on additional features. For example, while names with higher bond market implied equity volatility are chosen for the insurance portfolio, the corresponding name chosen for the risk portfolio that has a lower bond market implied equity volatility can have a similar credit quality. Similarly, for the equity market implied equity volatility, while names with a higher equity market implied equity volatility can be selected for the risk portfolio, names that have a lower equity market implied equity volatility can be selected for the insurance portfolio to optimize the volatility spread between names in the risk and insurance portfolios.

Additionally, industry and geography characteristics can be considered when selecting names for the risk and insurance portfolios. As noted in the table in FIG. 15, the names that are selected can be diversified across different industries and geography. Furthermore, while the industry and geography are diversified within the risk and insurance portfolios, names can be chosen to correlate similar industries and geographies between the risk and insurance portfolios. For example, equally weighted repetitions in each of the risk and insurance portfolios can be included such that when are there are market movements in one particular industry or region, the names in one portfolio offset the names in the other portfolio.

By way of example only, a North American auto manufacturer with a high equity market implied equity volatility may be chosen for the risk portfolio. Therefore, it would be desirable to locate a North American auto manufacturer (similar industry and geography) with a high bond market implied equity volatility for the insurance portfolio. Furthermore, it would also be desirable that the second North American auto manufacturer has a similar credit rating and optimized volatility spread to the first North American auto manufacturer.

Figure 6:
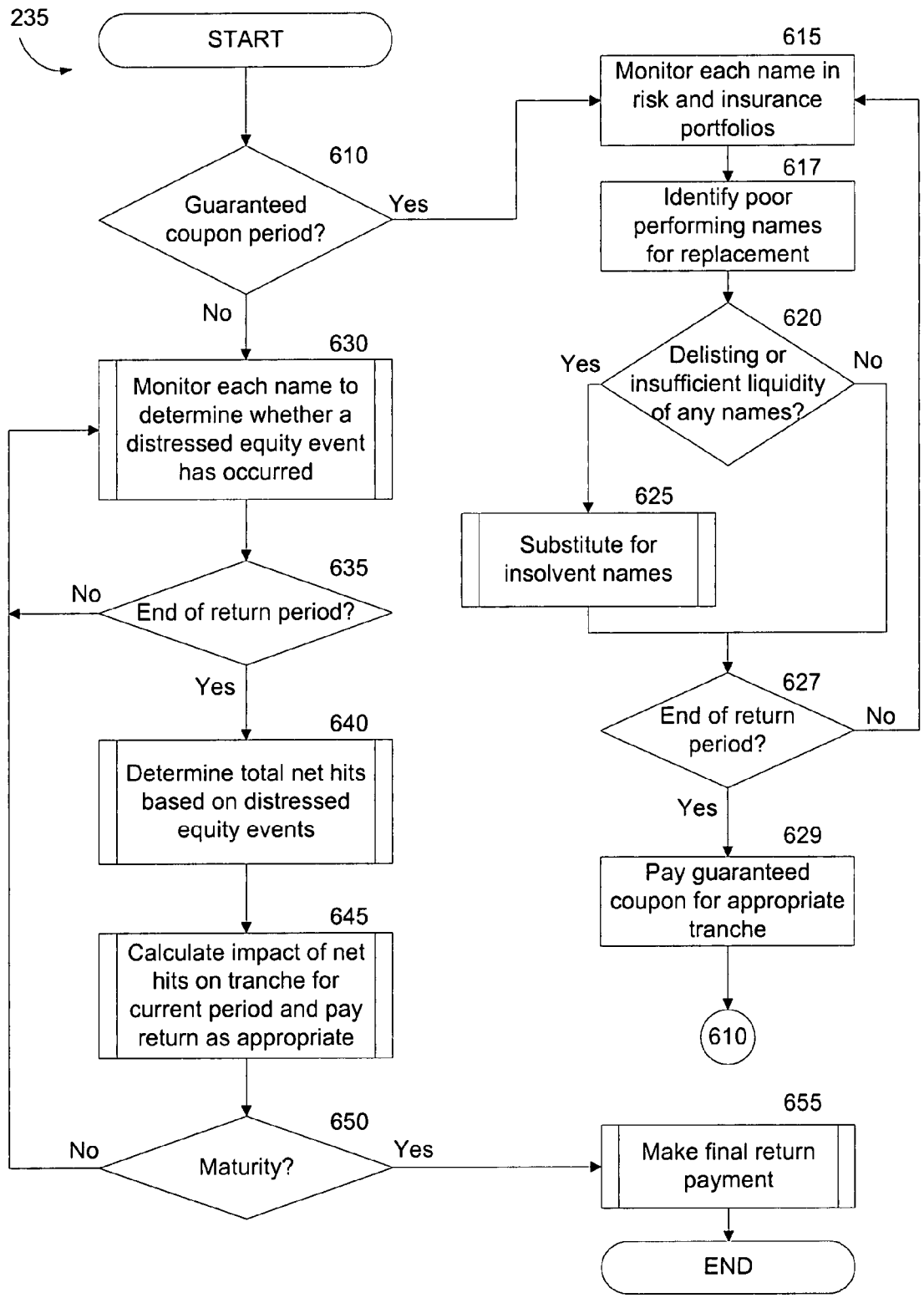
FIG. 6 is a flow chart illustrating a method for determining and paying a return for a CEDO financial product according to an exemplary embodiment of the invention.

FIG. 6 is a flow chart illustrating a method 235 for determining and paying a return for a CEDO financial product according to an exemplary embodiment of the invention, as referred to in step 235 of FIG. 2. The method 235 will be described with reference to FIGS. 1 and 6.

The notes as discussed herein can be set to mature in a predetermined amount of time. Furthermore, in an exemplary embodiment, the financial product can be configured to guarantee a return of a fixed coupon payment for a predetermined portion of the lifetime of the notes. By way of example only, the method 235 will be described hereinafter with a maturity of six years and with a guaranteed coupon payment for the first three years. Other maturity periods and periods of return are suitable.

In decision step 610, the method 235 determines whether a coupon is guaranteed for the current return period. In exemplary embodiments, the return period can comprise a day, week, month, year, or other suitable period. If yes, the method 235 branches to step 615. During a guaranteed coupon period, the investors 105 are effectively protected against distressed equity events. Therefore, during a guaranteed coupon period, the sponsor 110 will monitor all the names in the risk and insurance portfolios in step 615. In step 617, the sponsor 110 will identify poorly performing names for possible replacement. Then, in decision step 620, the sponsor 110 will determine whether any names in the risk and insurance portfolios have been delisted or have insufficient liquidity. If yes, those insolvent names will be substituted in step 625. Step 625 will be discussed in more detail hereinafter with reference to FIG. 7. After the insolvent names have been substituted in step 625, the method 235 proceeds to step 627.

Referring back to step 620, if the method 235 determines that names have not been delisted or do not have insufficient liquidity, then the method 235 can branch directly to step 627.

In step 627, the method 235 determines whether it is the end of the period for which a return is due. If not, then the method 235 returns to step 615 to continue monitoring the names in the risk and insurance portfolios.

If it is the end of the return period, the method 235 branches from step 627 to step 629 in which the sponsor 110 administering the SPV 115 pays the guaranteed coupon at a predefined rate for each tranche. The amount of the guaranteed coupon depends on the tranche in which a particular investor has invested. After the guaranteed coupon has been paid in step 629, the method 235 returns to decision step 610 to determine whether the SPV 115 is still in a guaranteed coupon period.

Referring back to step 610, if the method 235 determines that the financial product is not in a guaranteed return period, the method 235 proceeds to step 630. In step 630, the sponsor 110 monitors each name in the insurance and risk portfolios and determines whether any of the names experience a distressed equity event. Step 630 will be discussed in more detail hereinafter with reference to FIG. 8.

In step 635, the method 235 will determine whether it is the end of the return period. If not, the method 235 returns to step 630 to continue monitoring each name in the insurance and risk portfolios to determine whether any of the names experience a distressed equity event.

If method 235 determines in step 635 that it is the end of the return period, the method 235 proceeds to step 640. In step 640, the sponsor 110 determines the net hits for the period based on the number of distressed equity events in the risk and insurance portfolios. Step 640 will be discussed in more detail hereinafter with reference to FIG. 9. In step 645, the method 235 calculates the impact of the net hits on the impacted tranche(s) and pays the return, if any, for the return period. Step 645 will be discussed in more detail hereinafter with reference to FIG. 10.

After the sponsor 110 calculates the impact of the net hits on the tranche(s) in step 645, the method 235 will determine whether it is in its maturity period in decision step 650. If yes, the sponsor 110 administering the SPV 115 will make its final note payment in step 655, and method 235 will end. Step 655 will be discussed in more detail hereinafter with reference to FIG. 11. However, if it is not the maturity period as determined in decision step 650, the method 235 will return to step 630.

Figure 7:
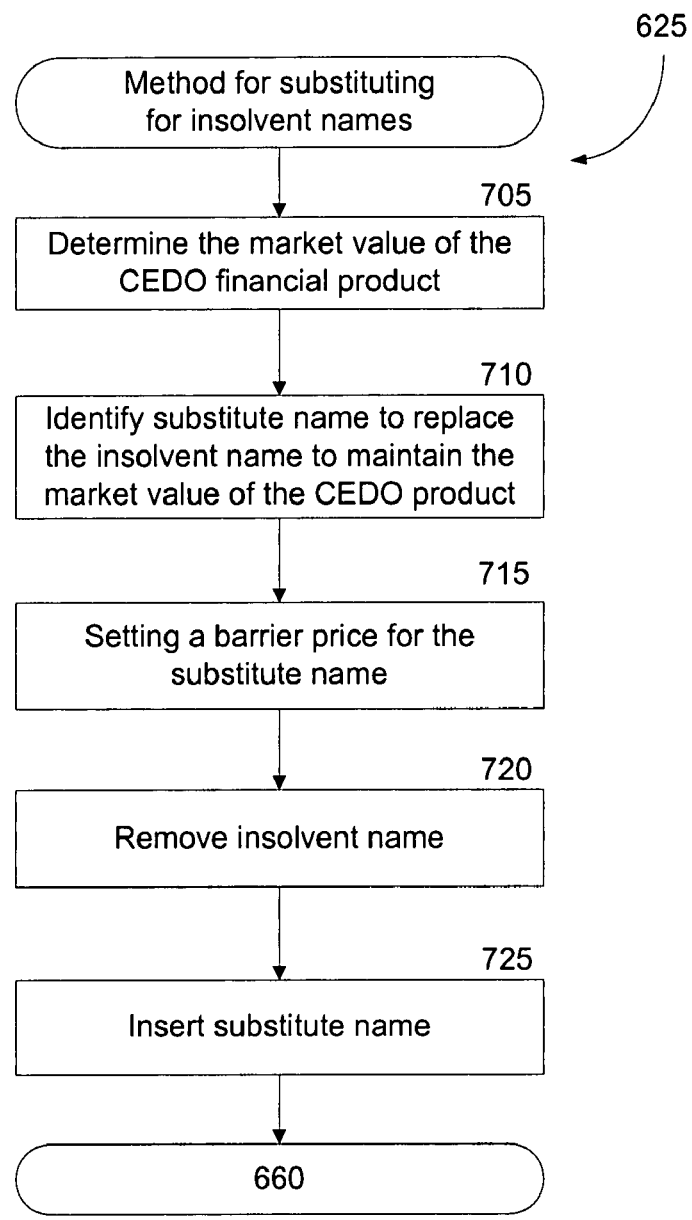
FIG. 7 is a flow chart illustrating a method for substituting a new name for an insolvent name according to an exemplary embodiment of the invention.

FIG. 7 is a flow chart illustrating a method 625 for substituting a new name for an insolvent name according to an exemplary embodiment of the invention, as referred to in step 625 of FIG. 6. The method 625 will be described with reference to FIGS. 1 and 7.

In step 620 of FIG. 6, if it was determined that any names in the risk and insurance portfolios have been delisted or have insufficient liquidity, or if the manager 110 has decided to make a substitution relying on his expertise, those names can be replaced in the method 625 described hereinafter with reference to FIG. 7. In step 705, the sponsor 110 determines the market value of the CEDO financial product. In step 710, the sponsor 110 identifies a substitute name to replace the insolvent name to maintain the market value of the CEDO product. The substitute name is identified utilizing the features as discussed previously with reference to FIG. 15.

After a substitute name has been identified in step 710, the sponsor 110 sets the barrier price of the substitute name to maintain the market value of the CEDO product in step 715. In exemplary embodiments, the barrier can be 30-35% of the original price of the insolvent name. After the barrier price of the substitute name is set in step 715, the insolvent name is removed from its associated portfolio in step 720, and the substitute name is inserted in its place in step 725. After step 725, the method 625 ends and returns to decision step 627 in FIG. 6.

Figure 8:
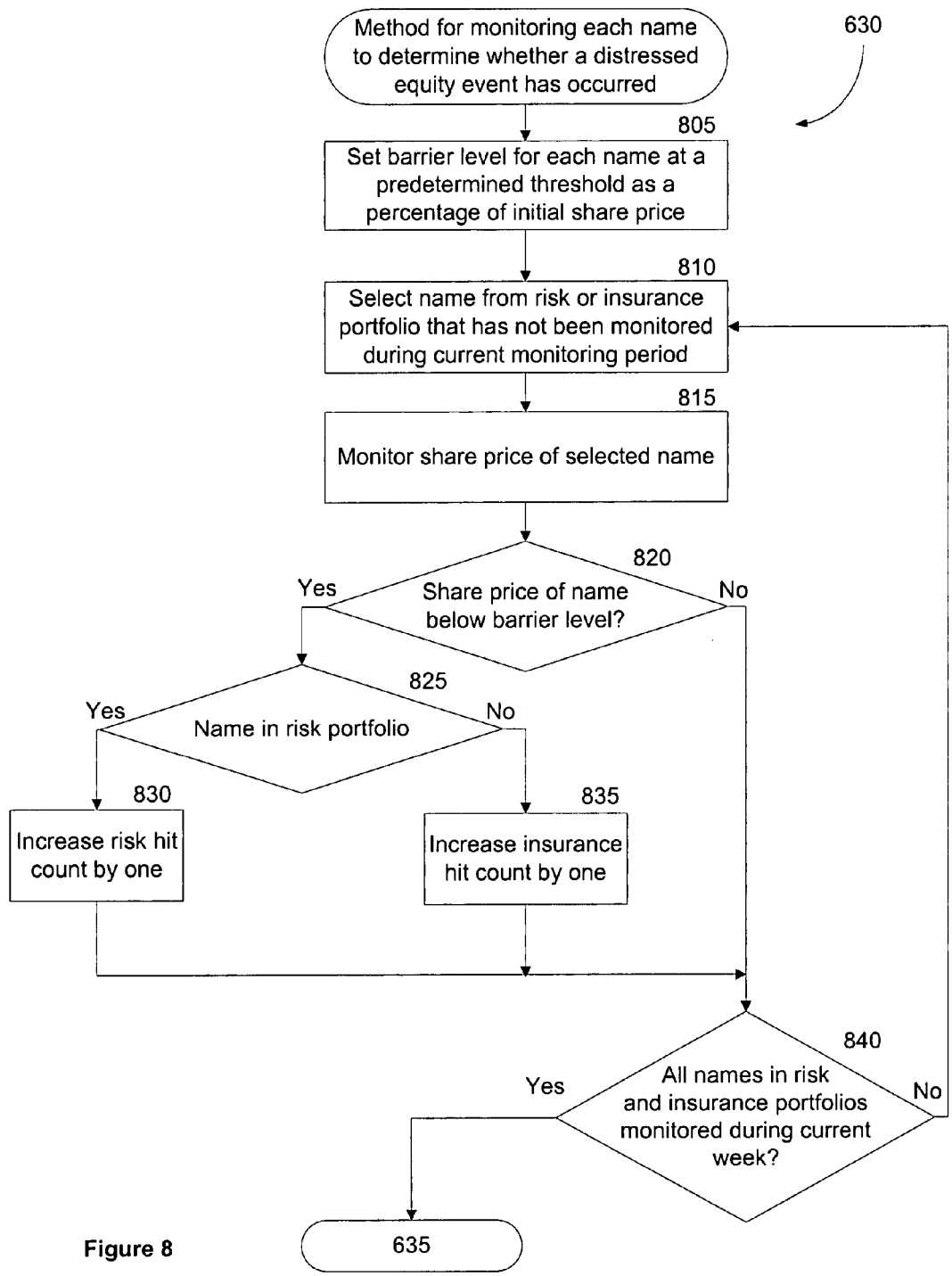
FIG. 8 is a flow chart illustrating a method for monitoring the names in the risk and insurance portfolios and determining whether a distressed equity event has occurred according to an exemplary embodiment of the invention.

FIG. 8 is a flow chart illustrating a method 630 for monitoring the names in the risk and insurance portfolios and determining whether a distressed equity event has occurred according to an exemplary embodiment of the invention, as referenced in step 630 of FIG. 6. The method 630 will be described with reference to FIGS. 1 and 8.

In step 610 of FIG. 6, if it was determined that it is not a guaranteed coupon period, then the sponsor 110 would begin monitoring each name located in the risk and insurance portfolios to determine whether a distressed equity event occurred.

In step 805, a barrier level is set for each name in the risk and insurance portfolios at a predetermined threshold, which can be a percentage of the initial share price. By way of example only, the barrier level can comprise 35% of an initial share price; therefore, the barrier represents the point when a share has lost 65% of its initial value. In an exemplary embodiment, beginning in the first non-guaranteed coupon period, the sponsor 110 monitors the share price of each name on a weekly basis to determine whether the share price is below the predetermined barrier level. Other monitoring periods are suitable and can be based on the length of the return period. In response to the share price being below the barrier level, the sponsor 110 increments a risk or insurance hit counter based on whether the name is in the risk or insurance portfolio. The concept of the hit can signify a percentage lost by the investors 105 on the initial value of the name that has been hit. By way of example only, the threshold for hits per name could be set at 10; therefore, for each hit for a name, it represents that 10% of the initial value of that name has been lost. The concept behind the hits allows the risk to spread over time as a hit can only be triggered once a week.

In step 810, the method 235 selects one of the names from the risk or insurance portfolios that have not been monitored during current monitoring period. In step 815, the method 235 monitors the current share price of the name selected in step 810. In decision step 820, the method 235 determines whether the current share price of the name selected in step 810 is below its barrier level as determined in step 805. If yes, the method 235 branches to step 840 discussed hereinafter. However, if the current share price of the name is below its barrier level, the method 235 determines in decision step 825 whether the name is in the risk portfolio. If yes, the method 235 branches to step 830 in which the method 235 increases a risk hit count by one. Otherwise, if the name is not in the risk portfolio, the method 235 branches to step 835 in which the method 235 increases an insurance hit count by one.

After either increasing the risk hit count in step 830 or the insurance hit count in step 835, the method 235 proceeds to step 840. In step 840, the method 235 determines whether all of the names in the risk and insurance portfolios have been monitored during current monitoring period. If not, the method 235 returns to step 810 to select another name from the risk or insurance portfolios that has not been monitored during current period. Otherwise, if all the names in both the risk and insurance portfolios have been monitored during the current monitoring period, method 630 ends and returns to step 635 in FIG. 6.

Figure 9:
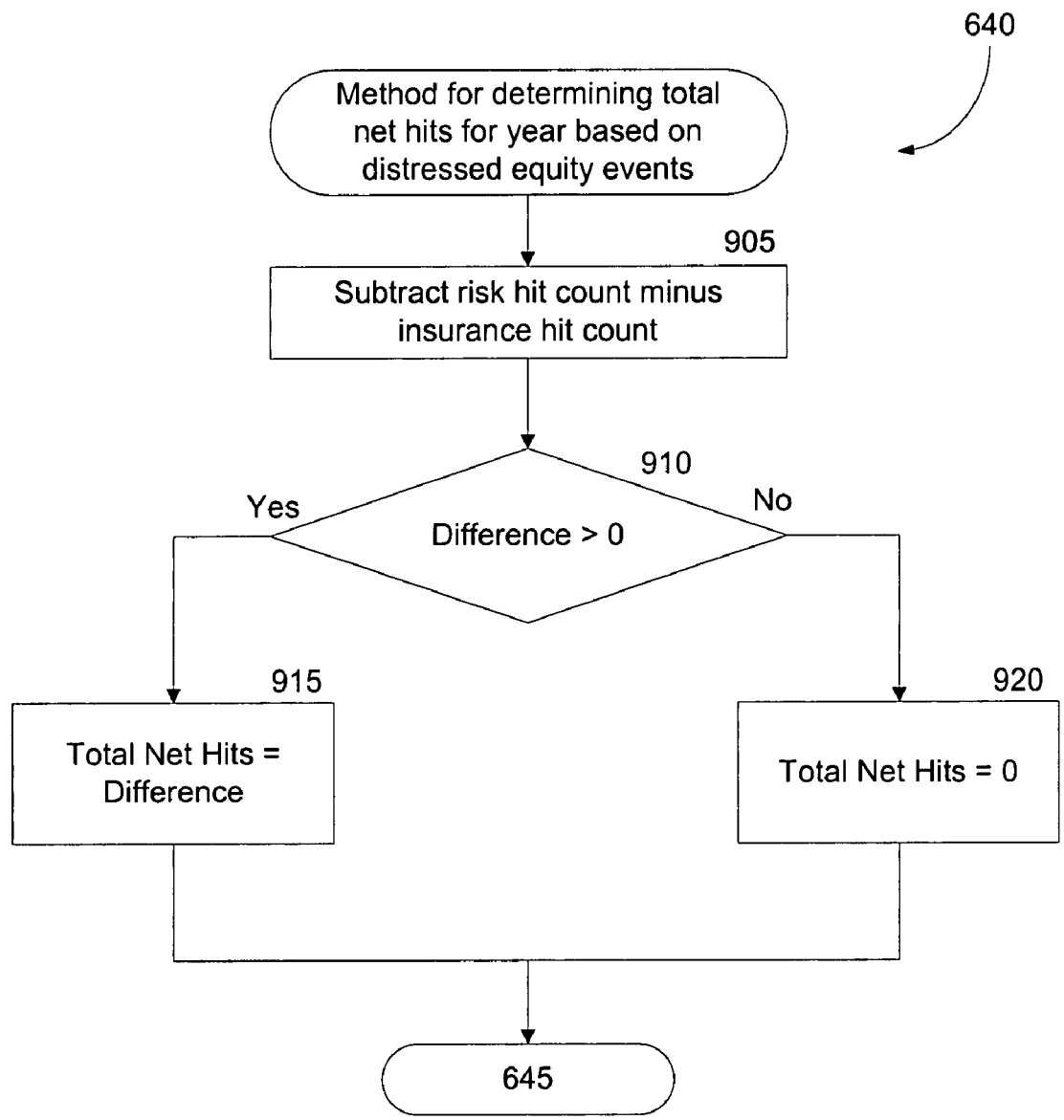
FIG. 9 is a flow chart illustrating a method for determining the total number of net hits for a return period based on the number of distressed equity events according to an exemplary embodiment of the invention.

FIG. 9 is a flow chart illustrating a method 640 for determining the total number of net hits for a return period based on the number of distressed equity events according to an exemplary embodiment of the invention, as referred to in step 640 of FIG. 6. The method 640 will be described with reference to FIGS. 1 and 9.

Proceeding from decision step 635 in FIG. 6, when the method 640 determines that it is the end of a non-guaranteed coupon period, the method 640 compiles the information for the return period from the insurance and risk pools. In step 905, the SPV subtracts the risk hit count from the insurance risk count. In decision step 910, the method 640 examines the difference between the risk hit count and the insurance risk count to determine the total net hits for the return period. If the difference between the risk hit count and the insurance risk count is greater than zero, the method 640 branches to step 915 in which the method 640 sets the total net hits equal to that difference. However, if the difference between the risk hit count and the insurance risk count is not greater than zero, the method 640 branches to step 920 in which the method 640 sets the total net hits equal to zero. After the method 640 sets the total net hits in step 915 or step 920, the method 640 ends and returns to step 645 of FIG. 6.

In summary, the purpose of having a risk portfolio and insurance portfolio with similar names as discussed in reference to FIGS. 3-5 herein allows losses in the risk portfolio to be offset by gains in the insurance portfolio. Essentially, the investors 105, or note holders, are in a long risk position with respect to the risk portfolio. When a distressed equity event occurs with respect to a name in the risk portfolio, representing a drop in the share price below the barrier level, this represents a loss in that portfolio. To counteract the losses in the risk portfolio, the investors 105, or note holders, are in a short risk position with respect to the insurance portfolio. Opposite to a long risk position, there is a gain in a short risk position when the value of the name in the short risk position falls in value.

Figure 10:
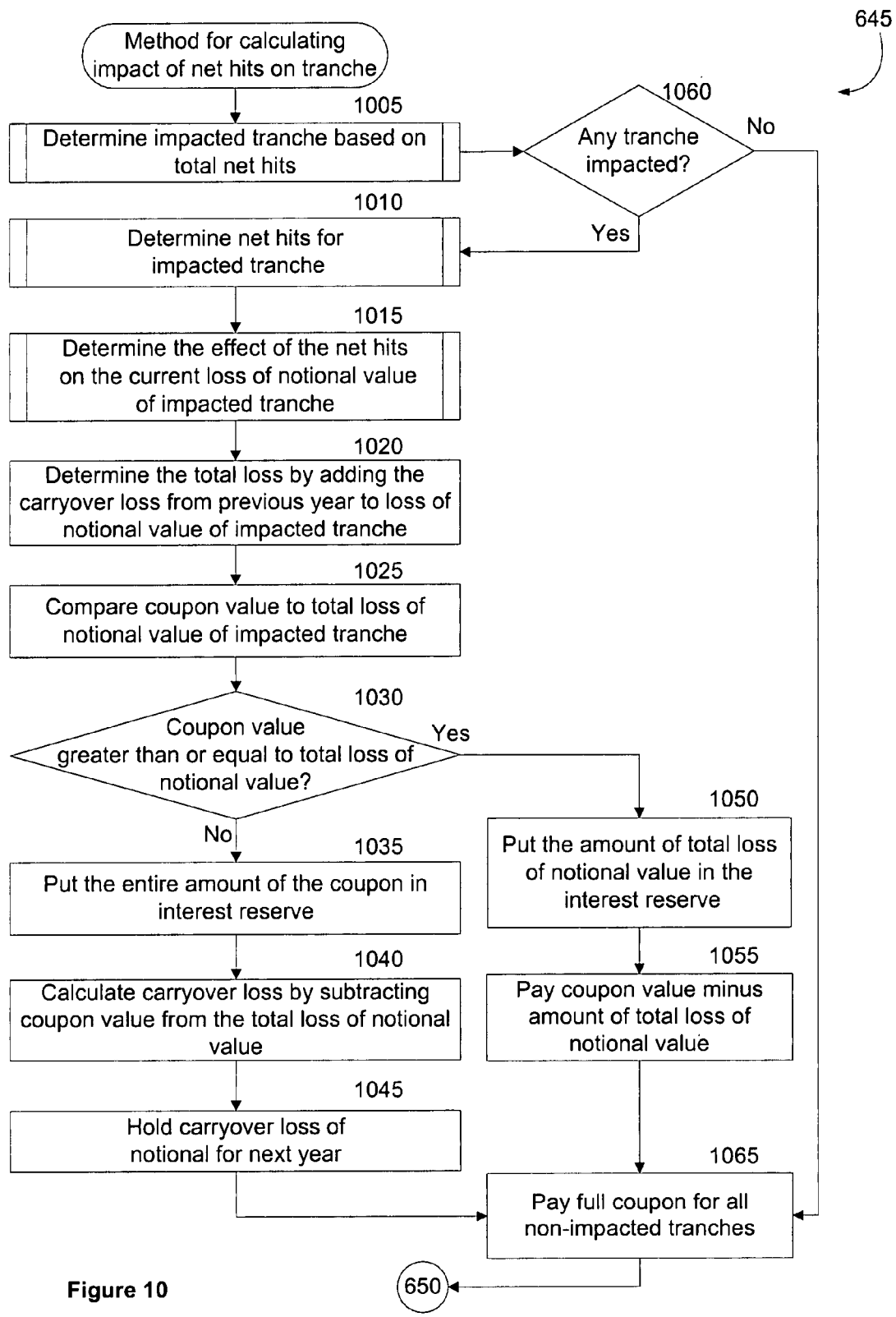
FIG. 10 is a flow chart illustrating a method for determining the impact of the net hits on a tranche during a particular return period according to an exemplary embodiment of the invention.

FIG. 10 is a flow chart illustrating a method 645 for determining the impact of the net hits on a tranche during a particular return period according to an exemplary embodiment of the invention, as referenced in step 645 of FIG. 6. The method 645 will be described with reference to FIGS. 1 and 10.

In step 1005, the method 645 determines which tranche has been impacted based upon the number of net hits as determined by the method 640 discussed previously with reference to FIG. 9. Step 1005 will be discussed in more detail hereinafter with reference to FIG. 11.

After determining which tranche has been impacted in step 1005, the method 645 then determines whether any tranche has been impacted in decision step 1060. If none of the tranches are impacted, the method 645 branches to step 1065 to pay the full coupon amount for all non-impacted tranches. Otherwise, if any tranche has been impacted, the method 645 branches to step 1010 to determine the net hits for the impacted tranche. Step 1010 will be discussed in more detail hereinafter with reference to FIG. 12.

In step 1015, the method 645 determines the effect the net hits causes on the current loss of the notional value of the impacted tranche. The notional value is the initial amount invested in the tranche. Step 1015 will be discussed in more detail hereinafter with reference to FIG. 13.

In step 1020, the total loss on the notional is determined by adding any carryover loss from a previous return period to the current loss of the notional value of the impacted tranche as determined in step 1015. During the first such return period, the carryover loss is zero. If a carryover loss does not exist from a previous return period, then a carryover loss will not be added in step 1020 to the current loss of the notional value.

In step 1025, the coupon value of the impacted tranche is compared to the total loss of notional value of the impacted tranche as calculated in steps 1020. In decision step 1030, the method 645 determines whether the coupon value is greater than or equal to the total loss of the notional value. If not, the method 645 branches to step 1035 in which the entire amount of the coupon is placed into an interest reserve. Subsequently, in step 1040, the method 645 calculates the carryover loss by subtracting the coupon value from the total loss of the notional value. Then, in step 1045, the method 645 holds the carryover loss of the notional value for the next return period. The method 645 then proceeds to step 1065 discussed hereinafter.

Referring back to decision step 1030, if the coupon value is greater than or equal to the total loss of the notional value, then the method 645 branches to step 1050 in which the method 645 puts the amount of total loss of notional value in the interest reserve. Next, in step 1055, the sponsor 110 administering the SPV 115 pays the coupon value minus the total loss of notional value to the investors 105. If the coupon value equals the total loss of notional value, then the return to the investors 105 in step 1055 will be zero. The method then proceeds to step 1065.

In step 1065, the method 645 will pay the full coupon amount for all non-impacted tranches. Subsequently, the method 645 returns to decision step 650 in FIG. 6 to determine whether the notes at maturity. As discussed above with reference to FIG. 6, if it is the maturity period, the sponsor 110 administering the SPV 115 also will pay the final return in step 655 and method 235 will end.

Figure 11:
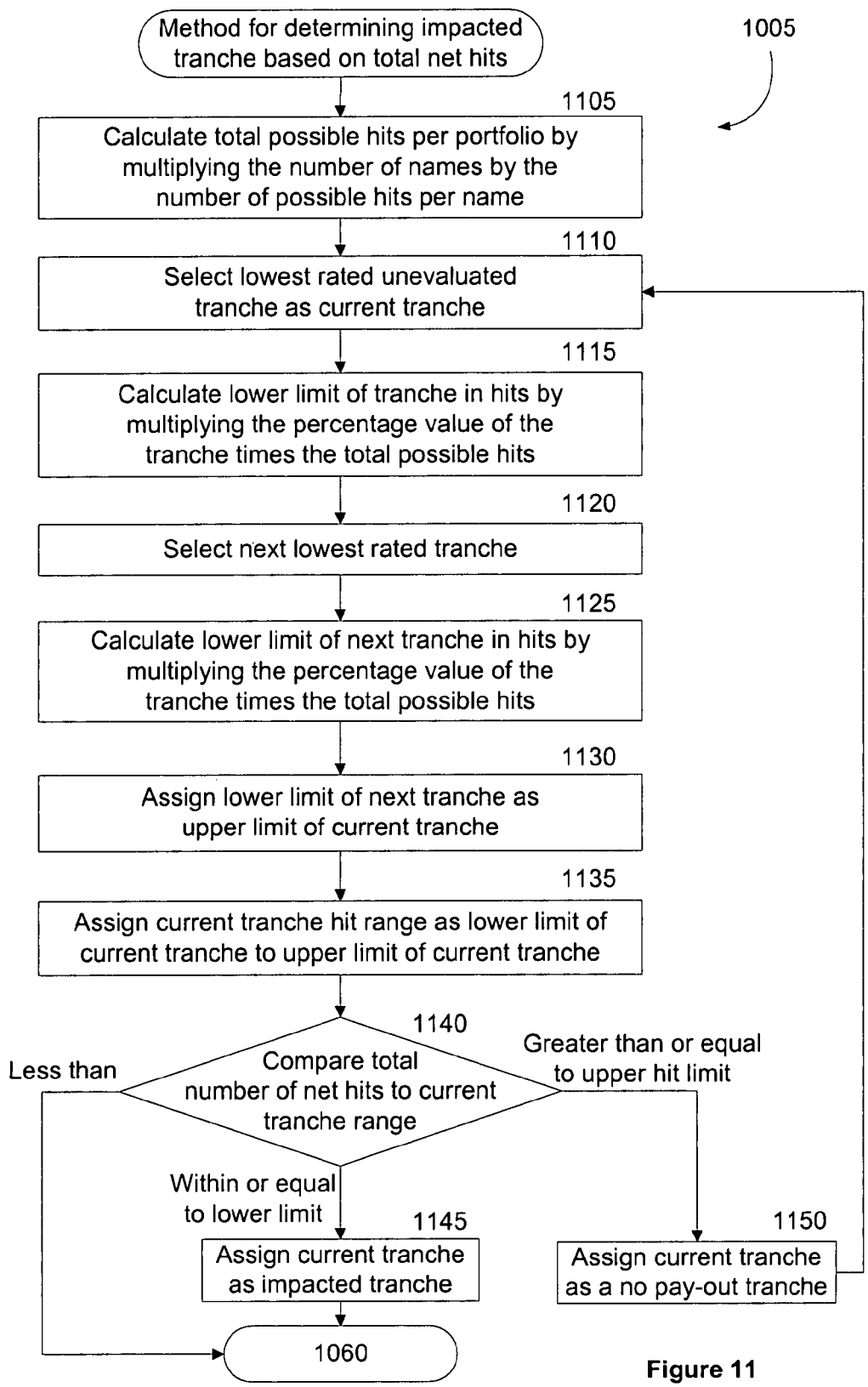
FIG. 11 is a flow chart illustrating a method for determining the impacted tranche based on total net hits according to an exemplary embodiment of the invention.

FIG. 11 is a flow chart illustrating a method 1005 for determining the impacted tranche based on total net hits according to an exemplary embodiment of the invention, as referenced in step 1005 of FIG. 10. The method 1005 will be described with reference to FIGS. 1 and 11.

In step 1105, the method 1005 calculates the total possible hits per portfolio by multiplying the number of names in the portfolio by the number of possible hits per name. For example, if 60 names are in a portfolio and each name is allowed 10 hits, then the total possible hits per portfolio is 600.

In step 1110, the method 1005 selects the lowest rated, unevaluated tranche as a current tranche to determine whether the current tranche is impacted by the total net hits. Next, in step 1115, the method 1005 calculates a lower limit of the current tranche in hits by multiplying the percentage value of the current tranche times the total possible hits as determined in step 1110. The percentage value of the current tranche is the portion of the total investment in all tranches that is allocated to the current tranche.

In step 1120, the method 1005 selects the next lowest rated tranche. Then, in step 1125, the sponsor 110 calculates the lower limit of this next tranche selected in step 1120 in hits by multiplying the percentage value of the next tranche times the total possible hits as determined in step 1110. The sponsor 110 assigns the lower limit of the next tranche as determined in step 1125 as the upper limit of current tranche in step 1130. Therefore, in step 1135, the resulting hit range of the current tranche is assigned as the lower limit of the current tranche to the upper limit of the next tranche.

After the hit range of the current tranche is assigned in step 1135, the method 1005 proceeds to step 1140 to compare the total number of net hits to the current tranche hit range to identify whether the current tranche is impacted based on the total number of net hits. If the total number of net hits is less than the hit range of the current, this indicates that the current tranche will not be impacted by the current total number of net hits. Furthermore, because method 1005 begins by selecting the lowest rated tranche in step 1105, this result indicates that none of the tranches are impacted by the current total number of net hits because the lowest rated tranche would have been the first tranche to be impacted by the net hits. Therefore, for the scenario where the total number of net hits is less than the current hit range for the first lowest rated tranche, the method 1005 ends and returns to step 1060 of FIG. 10.

Returning to decision step 1140, if the total number of net hits falls within the hit range of the current tranche or is equal to the lower hit limit of the tranche, this result indicates that the current tranche is the tranche that will be impacted by the current total number of net hits. Therefore, the method 1005 branches to step 1145 in which the current tranche is assigned as the impacted tranche. After step 1145, method 1005 ends and returns to step 1060 of FIG. 10.

Finally, returning to decision step 1140, if the total number of net hits is greater than the hit range of the current tranche or equal to the upper hit limit of the current tranche, this indicates that the current tranche has been completely impacted by the current total number of net hits. Subsequently, the method 1005 branches to step 1150 in which the method 1005 will verify that no coupon pay out will be made for the current tranche by assigning this tranche as a no pay-out tranche. The method 1005 then returns to step 1105 to evaluate the next lowest rated tranche to determine whether it is impacted.

Figure 12:
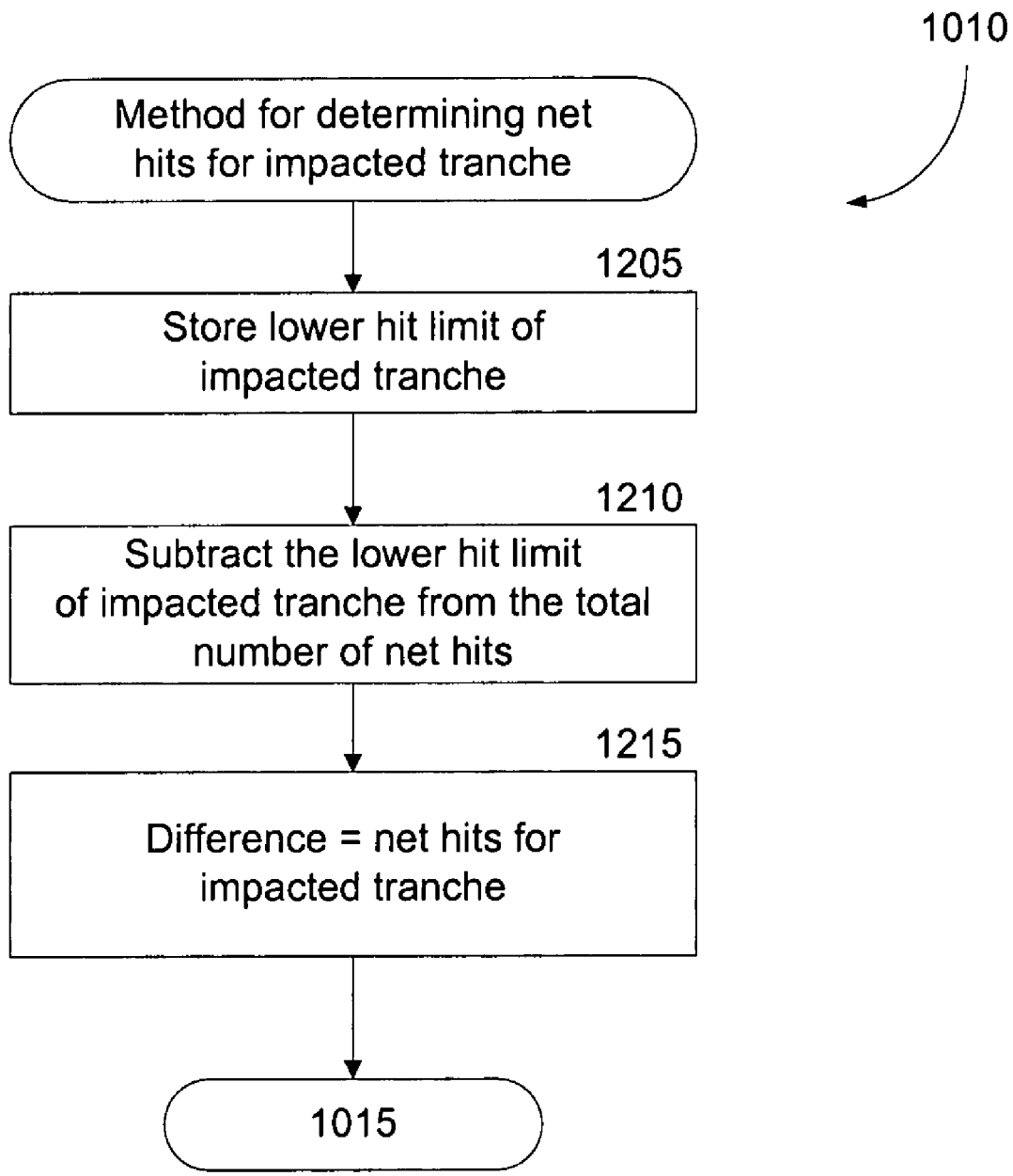
FIG. 12 is a flow chart illustrating a method for determining the net hits for the impacted tranche according to an exemplary embodiment of the invention.

FIG. 12 is a flow chart illustrating a method 1010 for determining the net hits for the impacted tranche according to an exemplary embodiment of the invention, as referenced in step 1010 of FIG. 10. The method 1010 will be described with reference to FIGS. 1 and 12.

In step 1205, the method 1010 stores the lower hit limit of the impacted tranche. The lower hit limit of the impacted tranche was determined in step 1115 as previously discussed with reference to FIG. 11.

In step 1210, the method 1010 subtracts the lower hit limit value of the impacted tranche from the total number of net hits, as determined by the method 640 discussed previously with reference to FIG. 9.

In step 1215, the method 1010 stores the resulting difference from step 1210 as the net hits for the impacted tranche. After step 1215, the method 1010 ends and returns to step 1015 of FIG. 10.

Figure 13:
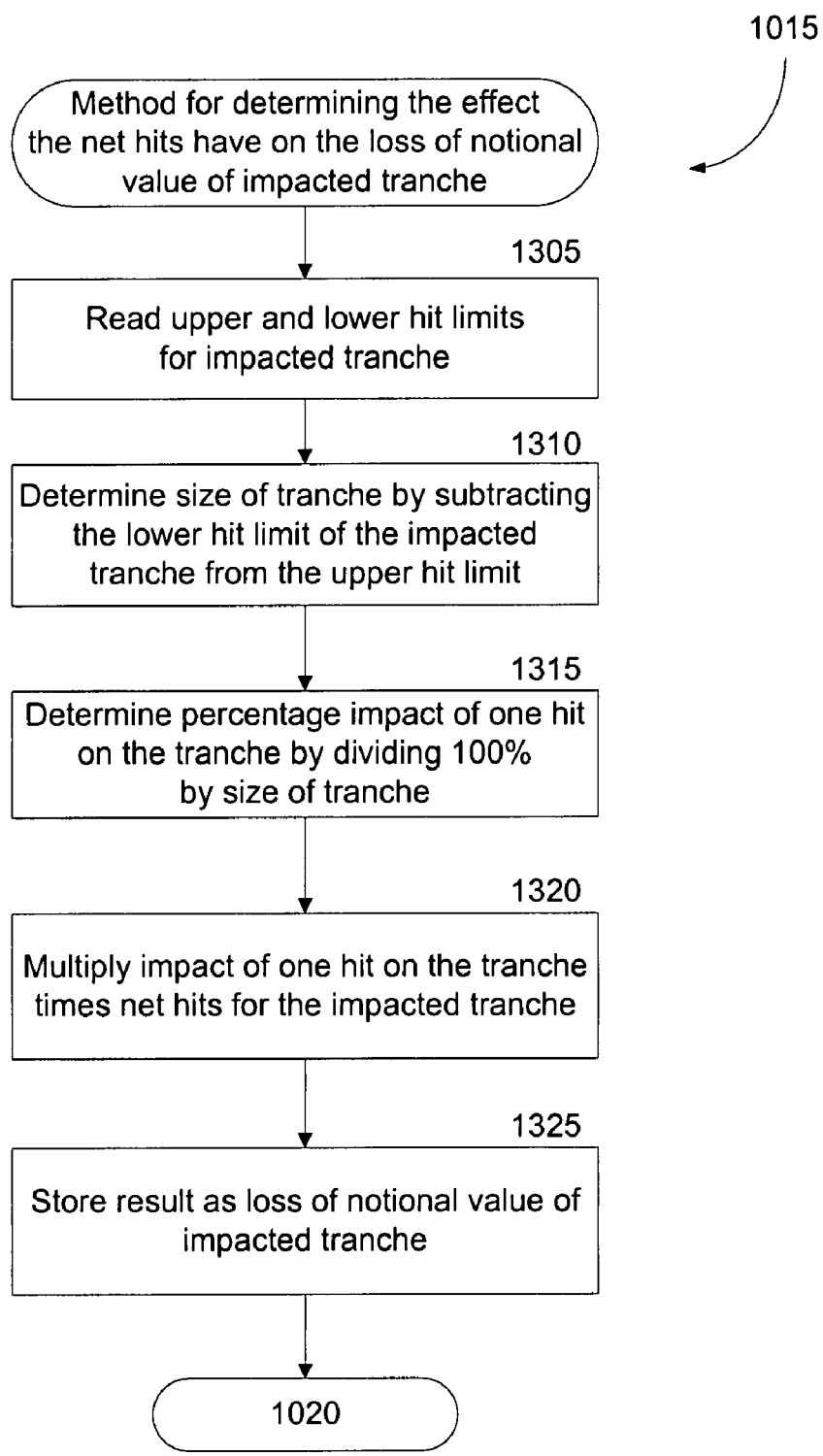
FIG. 13 is a flow chart illustrating a method for determining the effect of the net hits on the loss of the notional value of the impacted tranche according to an exemplary embodiment of the invention.

FIG. 13 is a flow chart illustrating a method 1015 for determining the effect of the net hits on the loss of the notional value of the impacted tranche according to an exemplary embodiment of the invention, as referenced in step 1015 of FIG. 10. The method 1015 will be described with reference to FIGS. 1 and 13.

In step 1305, the method 1015 reads the upper and lower hit limits of the impacted tranche. Then, in step 1310, the method 1015 determines the size of the impacted tranche by subtracting the lower hit limit from the upper hit limit.

In step 1315, the method 1015 determines the percentage impact that one hit has on the impacted tranche by dividing 100% by the size of the tranche as determined in step 1310. Next, in step 1320, the method 1015 multiplies the impact that one hit has on the impacted tranche as determined in step 1315 times the net hits for the impacted tranche as determined in method 1010 discussed previously with reference to FIG. 12.

In step 1325, the method 1015 stores the result of step 1320 as the percentage loss of the notional value of the impacted tranche. After step 1325, the method 1015 ends and returns to step 1020 of FIG. 10.

Figure 14:
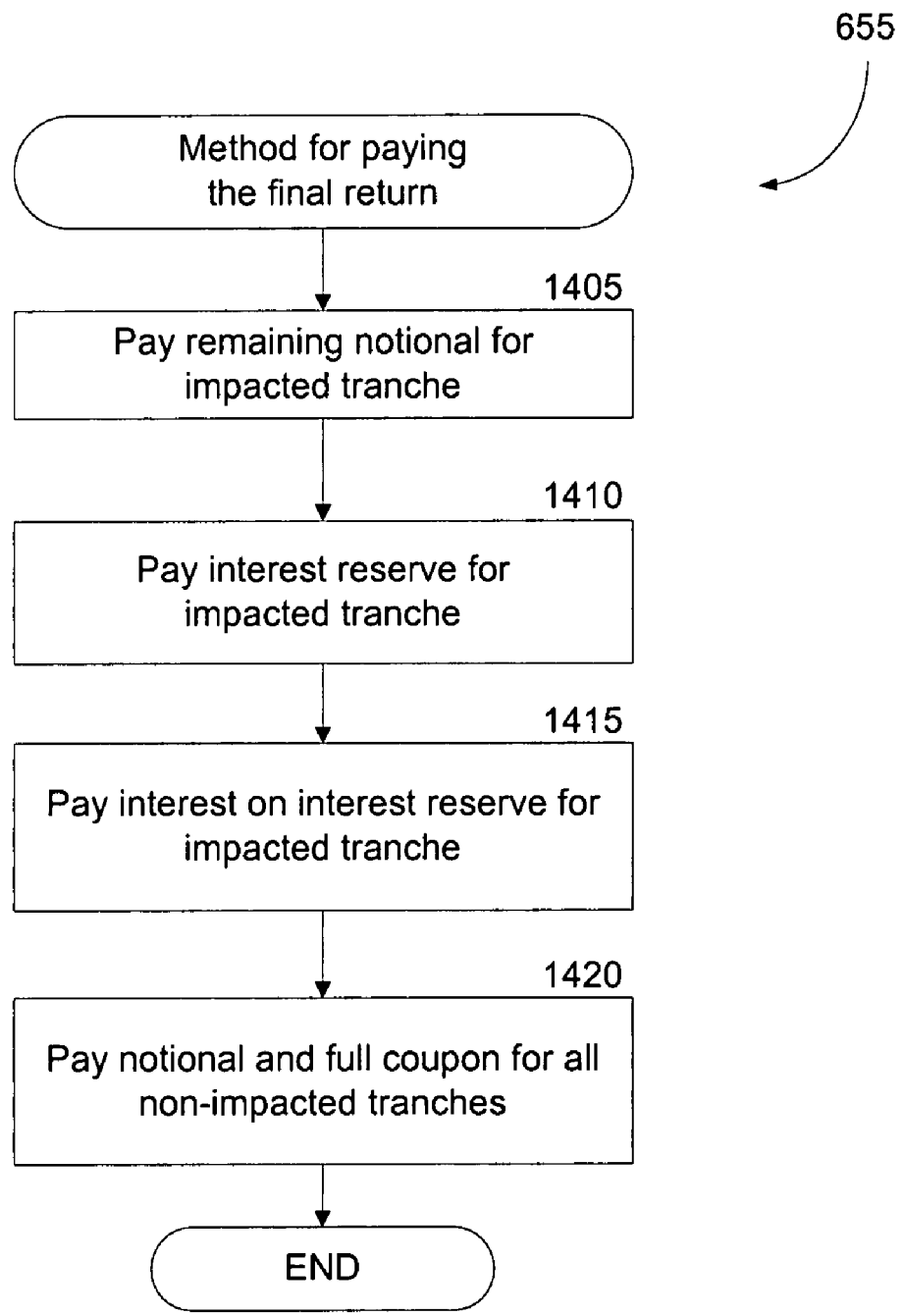
FIG. 14 is a flow chart illustrating a method for paying the final return upon maturity of the notes according to an exemplary embodiment of the invention.

FIG. 14 is a flow chart illustrating a method 655 for paying the final return upon maturity of the notes according to an exemplary embodiment of the invention, as referenced in step 655 of FIG. 6. The method 655 will be described with reference to FIGS. 1 and 14. After determining in decision step 350 that the notes issued to the investors 105 have reached maturity, the sponsor 110 administering the SPV 115 will make the final return payment as described in the method 655.

In step 1405, the sponsor 110 administering the SPV 115 pays the investors 105 the remaining notional for the impacted tranche. Next, in step 1410, the sponsor 110 administering the SPV 115 pays the investors 105 any interest reserve that has accumulated. In step 1415, the sponsor 110 administering the SPV 115 pays the investors 105 any interest that has accrued on the interest reserve. Finally, in step 1420, the sponsor 110 administering the SPV 115 pays the investors 105 the notional and full coupon for all non-impacted tranches. After step 1420, the method 655 ends.

In summary, specific embodiments of the invention have been described which teach the creation of a CDO transaction involving EDS within a long risk and short risk (risk and insurance) portfolio to exploit the relative value opportunities between equity and debt. The use of a short risk portfolio to offset losses by the long risk portfolio provides greater protection to investors and gives the CDO transaction the ability to achieve a higher rating. Furthermore, the CDO transaction can be created to guarantee a coupon payment for a predetermined period of the transaction. The combination of these two features, along with additional features described above in detail, allow the invention to achieve the highest possible rating, AAA, from a ratings service, which is a company such as Moody's or Standard & Poor's, which rates various debt and preferred stock issues. The ability to achieve the highest possible rating is extremely important to investors because it gives credibility to the transaction and many investors are restricted to only AAA investments.

The methods, including the individual steps of those methods, described herein can be implemented on a computer. Additionally, the invention can be embodied in a computer-readable medium having computer-executable instructions for performing the various methods, including the individual steps of those methods, described herein.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A method for creating and operating a financial product, comprising the steps of:
    assigning via a computer a first plurality of names to a first portfolio and a second plurality of names to a second portfolio, the first and second pluralities of names being associated with a plurality of tranches;
    identifying via a computer occurrences of distressed equity events for respective ones of the names in the first and second portfolios, comprising the steps of, for each of the names,
        setting a barrier level for the name at a predetermined threshold as a percentage of an initial share price of the name, and
        determining whether the current share price of the name is below its corresponding barrier level during a monitoring period, thereby indicating a distressed equity event,
    determining via a computer an impact of the identified distressed equity events on each of the tranches; and
    paying a return for investment in each of the tranches based on the determined impact.

2. The method of claim 1, wherein the assigning step comprises:
    filtering names by assessing a relative value between debt and equity for each of the names; and
    selecting names to assign to one of the first and second portfolios based on the relative value for each of the names.

3. The method of claim 2, wherein the assigning step further comprises filtering the names to identify names that meet at least one of a predetermined credit rating and liquidity level prior to filtering the names to assess a relative value between debt and equity of each name.

4. The method of claim 2, wherein the filtering step comprises utilizing a model that assesses the relative value between the debt and the equity of each name.

5. The method of claim 2, wherein the filtering step comprises, for each name:
    selecting the name for analysis as a potential name;
    determining a bond market implied equity volatility for the potential name;
    determining an equity market implied equity volatility for the potential name; and
    assigning the potential name to a potential portfolio based on the relationship between the equity market implied equity volatility and the bond market implied equity volatility.

6. The method of claim 5, wherein the step of assigning the potential name to a potential portfolio comprises the steps of:
    assigning the potential name to a first potential portfolio if the bond market implied equity volatility is greater than the equity market implied equity volatility; and
    assigning the potential name to a second potential portfolio if the equity market implied equity volatility is greater than the bond market implied equity volatility.

7. The method of claim 2, wherein the step of selecting names to assign to one of the first and second portfolios based on the relative value for each of the names comprises:
    selecting one name from the second potential portfolio for assignment to the second portfolio;
    selecting another name from the first potential portfolio for assignment to the first portfolio and having similar credit quality, industry, and geographical region to the one name selected from the second potential portfolio; and
    repeating these selecting steps until a number of desired names for the first and second portfolios is selected.

8. The method of claim 2, wherein the step of selecting names to assign to one of the first and second portfolios based on the relative value for each of the names comprises:
    selecting a risk name from a group of potential risk names for assignment to the second portfolio; and
    selecting an insurance name from a group of potential insurance names for assignment to the first portfolio, the selected insurance name having similar credit quality, industry, and geographical region to the risk name.

9. The method of claim 1, wherein each of the distressed equity events is defined as a share price for a name being below a predefined percentage of its original value during a monitoring period.

10. The method of claim 9, wherein the predefined percentage is thirty-five percent.

11. The method of claim 1, wherein the step of identifying occurrences of distressed equity events for respective ones of the names in the first and second portfolios further comprises the step of:
    for each of the names, incrementing a hit count by one in response to determining that the current share price is below the barrier level.

12. The method of claim 11, wherein the step of incrementing a hit count by one comprises the steps of:
    determining whether the name is in the first portfolio or the second portfolio;
    incrementing a first hit count by one in response to determining that the selected name is in the first portfolio; and
    incrementing a second hit count by one in response to determining that the selected name is in the second portfolio.

13. The method of claim 12, wherein the step of determining an impact of the identified distressed equity events on each of the tranches comprises the step of calculating a total number of net hits based on the occurrences of distressed equity events by:
    subtracting the first hit count from the second hit count;
    determining whether the result of the subtracting step is greater than zero; and
    assigning the result of the subtracting step as the total number of net hits in response to a determination that the result of the subtracting step is greater than zero.

14. The method of claim 1, wherein the step of determining an impact of the identified distressed equity events on each of the tranches comprises the steps of:
    determining which of the tranches is impacted by the identified distressed equity events;

determining a loss of notional value of an impacted tranche based on the identified distressed equity events; and reducing the return paid in the paying step for the impacted tranche based on the loss of notional value for the impacted tranche.

15. The method of claim 14, wherein the step of reducing the return paid for the impacted tranche comprises reducing a coupon for investment in the tranche by the loss of notional value of the impacted tranche.

16. The method of claim 14, wherein the step of reducing the return paid for the impacted tranche comprises reducing a coupon for investment in the tranche by the loss of notional value of the impacted tranche and by a carryover loss of notional value of the impacted tranche from a previous return period, the carryover loss of notional value being an amount by which a previous loss of notional value for the impacted tranche during the previous return period exceeded the coupon for investment in the tranche.

17. The method of claim 14, further comprising the step of placing an amount by which the coupon was reduced in the reducing step into a reserve to compensate for the loss of notional value of the impacted tranche.

18. The method of claim 17, wherein a final return paid in the paying step comprises:

paying a remaining notional value for each tranche, the remaining notional value for a particular tranche comprising the notional value remaining after accounting for any previous loss of notional value for the particular tranche;

paying the amount placed in reserve for the impacted tranche;

paying any interest earned on the amount placed in reserve; and paying a full return for all non-impacted tranches.

19. The method of claim 1, wherein the step of determining an impact of the identified distressed equity events on each of the tranches comprises the steps of:

determining an impacted tranche based on a total net number of hits for identified distressed equity events and a value of the impacted tranche, the total net number of hits being based on a difference between a number of distressed equity events identified for names in the second portfolio and a number of distressed equity events identified for names in the first portfolio;

determining a hit value for the impacted tranche, the hit value representing a number of distressed equity events that have an impact of a notional value of the impacted tranche;

determining a loss of notional value of the impacted tranche based on the hit value;

calculating a total loss of notional value by adding a carryover loss from a previous return period to the loss of notional value of the impacted tranche; and adjusting a base coupon for the impacted tranche based on the total loss of notional value, wherein the paying step comprises:
paying the adjusted coupon for the impacted tranche; and
paying a full coupon amount for any non-impacted tranches.

20. The method of claim 19, further comprising the steps of:

determining whether the base coupon is less than the total loss of notional value of the impacted tranche; and in response to determining that the base coupon is less than the total loss of notional value of the impacted tranche placing the value of the coupon in reserve, calculating the carryover loss of notional value for a current return period as the result of subtracting the base coupon from the total loss of notional value, and holding the carryover loss of notional value for the next return period.

21. The method of claim 19, wherein the step of determining an impacted tranche based on a total net number of hits comprises the steps of:

selecting a current tranche;

determining a current tranche hit range for the selected tranche;

determining whether the total number of net hits is within the current tranche hit range; and designating the current tranche as the impacted tranche in response to determining that the total number of net hits is within the current tranche hit range.

22. The method of claim 21, wherein the step of determining the current tranche hit range comprises the steps of:

selecting lowest rated unevaluated tranche as the current tranche;

calculating a total possible hits per portfolio by multiplying a number of names per portfolio by a number of predetermined possible hits per name;

calculating a lower limit of the current tranche in hits by multiplying a percentage value of the current tranche based on a sum of all tranche values by the total possible hits per portfolio;

selecting a next lowest rated unevaluated tranche as a next tranche;

calculating a lower limit of the next tranche in hits by multiplying a percentage value of the next tranche based on a sum of all tranche values times the total possible hits per portfolio; and assigning the lower limit of the next tranche as an upper limit of the current tranche, wherein the current tranche hit range is from the lower limit of the current tranche to the upper limit of the next tranche.

23. The method of claim 21, further comprising the steps of:

determining whether the total number of net hits is above the current tranche hit range; and designating the current tranche as a no pay-out tranche in response to a determination that the total number of net hits is above the current tranche hit range.

24. The method of claim 19, wherein the step of determining a hit value for the impacted tranche comprises the step of subtracting a lower hit limit of the impacted tranche from the total number of net hits to determine the hit value for the impacted tranche.

25. The method of claim 19, wherein the step of determining a loss of notional value of the impacted tranche based on the hit value comprises the steps of:

determining a size of the impacted tranche by subtracting a lower hit limit of the impacted tranche from an upper hit limit of the impacted tranche;

determining a percentage impact of one hit on the impacted tranche by dividing one hundred percent by the size of impacted tranche; and multiplying the percentage impact of one hit on the impacted tranche times the hit value for the impacted tranche, wherein the result of the multiplying step is the loss of notional value of the impacted tranche.

26. The method of claim 1, further comprising the step of substituting an insolvent name in one of the portfolios with a new name.

27. The method of claim 26, wherein the step of substituting an insolvent name comprises the steps of:
   determining a market value of the financial product;
   identifying a substitute name to replace the insolvent name to maintain the market value of the financial product;
   setting a barrier price for the substitute name;
   removing the insolvent name from its corresponding portfolio; and
   inserting the substitute name into the corresponding portfolio.

28. A computer-readable, non-transitory, tangible medium having computer-executable instructions for performing a computer-implemented method for creating and operating a financial product, the computer-readable medium comprising:
   computer-readable program code for assigning a first plurality of names to a first portfolio and a second plurality of names to a second portfolio, the first and second pluralities of names being associated with a plurality of tranches;
   computer-readable program code for identifying occurrences of distressed equity events for respective ones of the names in the first and second portfolios, comprising the steps of, for each of the names,
      setting a barrier level for the name at a predetermined threshold as a percentage of an initial share price of the name, and
      determining whether the current share price of the name is below its corresponding barrier level during a monitoring period, thereby indicating a distressed equity event,
   computer-readable program code for determining an impact of the identified distressed equity events on each of the tranches; and
   computer-readable program code for paying a return for investment in each of the tranches based on the determined impact.

29. The medium of claim 28, wherein the assigning comprises:
   filtering names by assessing a relative value between debt and equity for each of the names; and
   selecting names to assign to one of the first and second portfolios based on the relative value for each of the names.

30. The medium of claim 29, wherein the assigning further comprises filtering the names to identify names that meet at least one of a predetermined credit rating and liquidity level prior to filtering the names to assess a relative value between debt and equity of each name.

31. The medium of claim 29, wherein the filtering comprises utilizing a model that assesses the relative value between the debt and the equity of each name.

32. The medium of claim 29, wherein the filtering comprises, for each name:
   selecting the name for analysis as a potential name;
   determining a bond market implied equity volatility for the potential name;
   determining an equity market implied equity volatility for the potential name; and
   assigning the potential name to a potential portfolio based on the relationship between the equity market implied equity volatility and the bond market implied equity volatility.

33. The medium of claim 32, wherein the assigning the potential name to a potential portfolio comprises:
   assigning the potential name to a first potential portfolio if the bond market implied equity volatility is greater than the equity market implied equity volatility; and
   assigning the potential name to a second potential portfolio if the equity market implied equity volatility is greater than the bond market implied equity volatility.

34. The medium of claim 29, wherein the selecting names to assign to one of the first and second portfolios based on the relative value for each of the names comprises:
   selecting one name from the second potential portfolio for assignment to the second portfolio;
   selecting another name from the first potential portfolio for assignment to the first portfolio and having similar credit quality, industry, and geographical region to the one name selected from the second potential portfolio; and
   repeating these selecting steps until a number of desired names for the first and second portfolios is selected.

35. The medium of claim 29, wherein selecting names to assign to one of the first and second portfolios based on the relative value for each of the names comprises:
   selecting a risk name from a group of potential risk names for assignment to the second portfolio; and
   selecting an insurance name from a group of potential insurance names for assignment to the first portfolio, the selected insurance name having similar credit quality, industry, and geographical region to the risk name.

36. The medium of claim 28, wherein each of the distressed equity events is defined as a share price for a name being below a predefined percentage of its new value during a monitoring period.

37. The medium of claim 36, wherein the predefined percentage is thirty-five percent.

38. The medium method of claim 28, wherein the identifying occurrences of distressed equity events for respective ones of the names in the first and second portfolios further comprises:
   for each of the names, incrementing a hit count by one in response to determining that the current share price is below the barrier level.

39. The medium of claim 38, wherein the incrementing a hit count by one comprises:
   determining whether the name is in the first portfolio or the second portfolio;
   incrementing a first hit count by one in response to determining that the selected name is in the first portfolio; and
   incrementing a second hit count by one in response to determining that the selected name is in the second portfolio.

40. The medium of claim 39, wherein the determining an impact of the identified distressed equity events on each of the tranches comprises calculating a total number of net hits based on the occurrences of distressed equity events by:
   subtracting the first hit count from the second hit count;
   determining whether the result of the subtracting is greater than zero; and
   assigning the result of the subtracting as the total number of net hits in response to a determination that the result of the subtracting is greater than zero.

41. The medium method of claim 28, wherein the determining an impact of the identified distressed equity events on each of the tranches comprises:
   determining which of the tranches is impacted by the identified distressed equity events;
   determining a loss of notional value of an impacted tranche based on the identified distressed equity events; and
   reducing the return paid for the impacted tranche based on the loss of notional value for the impacted tranche.

42. The medium of claim 41, wherein the reducing the return paid for the impacted tranche comprises reducing a coupon for investment in the tranche by the loss of notional value of the impacted tranche.

43. The medium of claim 41, wherein the reducing the return paid for the impacted tranche comprises reducing a coupon for investment in the tranche by the loss of notional value of the impacted tranche and by a carryover loss of notional value of the impacted tranche from a previous return period, the carryover loss of notional value being an amount by which a previous loss of notional value for the impacted tranche during the previous return period exceeded the coupon for investment in the tranche.

44. The medium of claim 41, further comprising computer-readable program code for the placing an amount by which the coupon was reduced into a reserve to compensate for the loss of notional value of the impacted tranche.

45. The medium of claim 44, wherein a final return paid in the paying a return for investment in each of the tranches based on the determined impact comprises:
    paying a remaining notional value for each tranche, the remaining notional value for a particular tranche comprising the notional value remaining after accounting for any previous loss of notional value for the particular tranche;
    paying the amount placed in reserve for the impacted tranche;
    paying any interest earned on the amount placed in reserve; and
    paying a full return for all non-impacted tranches.

46. The medium of claim 28, wherein the determining an impact of the identified distressed equity events on each of the tranches comprises:
    determining an impacted tranche based on a total net number of hits for identified distressed equity events and a value of the impacted tranche, the total net number of hits being based on a difference between a number of distressed equity events identified for names in the second portfolio and a number of distressed equity events identified for names in the first portfolio;
    determining a hit value for the impacted tranche, the hit value representing a number of distressed equity events that have an impact of a notional value of the impacted tranche;
    determining a loss of notional value of the impacted tranche based on the hit value;
    calculating a total loss of notional value by adding a carryover loss from a previous return period to the loss of notional value of the impacted tranche; and
    adjusting a base coupon for the impacted tranche based on the total loss of notional value,
    wherein the paying comprises:
        paying the adjusted coupon for the impacted tranche; and
        paying a full coupon amount for any non-impacted tranches.

47. The medium of claim 46, further comprising computer-readable program code for:
    determining whether the base coupon is less than the total loss of notional value of the impacted tranche; and
    in response to determining that the base coupon is less than the total loss of notional value of the impacted tranche placing the value of the coupon in reserve,
    calculating the carryover loss of notional value for a current return period as the result of subtracting the base coupon from the total loss of notional value, and holding the carryover loss of notional value for the next return period.

48. The medium of claim 46, wherein the determining an impacted tranche based on a total net number of hits comprises:
    selecting a current tranche;
    determining a current tranche hit range for the selected tranche;
    determining whether the total number of net hits is within the current tranche hit range; and
    designating the current tranche as the impacted tranche in response to determining that the total number of net hits is within the current tranche hit range.

49. The medium of claim 48, wherein the determining the current tranche hit range comprises:
    selecting lowest rated unevaluated tranche as the current tranche;
    calculating a total possible hits per portfolio by multiplying a number of names per portfolio by a number of predetermined possible hits per name;
    calculating a lower limit of the current tranche in hits by multiplying a percentage value of the current tranche based on a sum of all tranche values by the total possible hits per portfolio;
    selecting a next lowest rated unevaluated tranche as a next tranche;
    calculating a lower limit of the next tranche in hits by multiplying a percentage value of the next tranche based on a sum of all tranche values times the total possible hits per portfolio; and
    assigning the lower limit of the next tranche as an upper limit of the current tranche,
    wherein the current tranche hit range is from the lower limit of the current tranche to the upper limit of the next tranche.

50. The medium of claim 48, further comprising computer-readable program code for:
    determining whether the total number of net hits is above the current tranche hit range; and
    designating the current tranche as a no pay-out tranche in response to a determination that the total number of net hits is above the current tranche hit range.

51. The medium of claim 46, wherein the determining a hit value for the impacted tranche comprises subtracting a lower hit limit of the impacted tranche from the total number of net hits to determine the hit value for the impacted tranche.

52. The medium of claim 46, wherein the determining a loss of notional value of the impacted tranche based on the hit value comprises:
    determining a size of the impacted tranche by subtracting a lower hit limit of the impacted tranche from an upper hit limit of the impacted tranche;
    determining a percentage impact of one hit on the impacted tranche by dividing one hundred percent by the size of impacted tranche; and
    multiplying the percentage impact of one hit on the impacted tranche times the hit value for the impacted tranche,
    wherein the result of the multiplying is the loss of notional value of the impacted tranche.

53. The medium of claim 28, further comprising computer-readable program code for substituting an insolvent name in one of the portfolios with a new name.

54. The medium of claim 53, wherein the substituting an insolvent name comprises:
   determining a market value of the financial product;
   identifying a substitute name to replace the insolvent name to maintain the market value of the financial product;
   setting a barrier price for the substitute name;
   removing the insolvent name from its corresponding portfolio; and
   inserting the substitute name into the corresponding portfolio.

* * * * *